United States Patent
Qu et al.

(10) Patent No.: US 10,812,305 B2
(45) Date of Patent: Oct. 20, 2020

(54) SIGNAL TRANSMISSION METHOD, TRANSMIT END, AND RECEIVE END

(71) Applicant: HUAWEI TECHNOLOGIES CO., LTD., Shenzhen, Guangdong (CN)

(72) Inventors: Bingyu Qu, Beijing (CN); Jianqin Liu, Beijing (CN); Yongxing Zhou, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 28 days.

(21) Appl. No.: 16/186,446

(22) Filed: Nov. 9, 2018

(65) Prior Publication Data

US 2019/0081838 A1 Mar. 14, 2019

Related U.S. Application Data

(63) Continuation of application No. PCT/CN2017/083078, filed on May 4, 2017.

(30) Foreign Application Priority Data

May 11, 2016 (CN) .......................... 2016 1 0311497

(51) Int. Cl.
*H04L 27/26* (2006.01)
*H04W 72/12* (2009.01)
(Continued)

(52) U.S. Cl.
CPC .......... *H04L 27/2614* (2013.01); *H04L 5/001* (2013.01); *H04L 5/0017* (2013.01);
(Continued)

(58) Field of Classification Search
CPC . H04L 27/26; H04L 27/2614; H04L 27/2636; H04L 5/001; H04L 5/0017; H04L 5/0066; H04W 72/04; H04W 72/12
See application file for complete search history.

(56) References Cited

U.S. PATENT DOCUMENTS

| 8,165,159 | B2 * | 4/2012 | Oketani | ................ H04L 5/0048 370/468 |
| 8,363,615 | B2 * | 1/2013 | Oketani | ................ H04L 5/0048 370/329 |

(Continued)

FOREIGN PATENT DOCUMENTS

| CN | 1723647 A | 1/2006 |
| CN | 101783781 A | 7/2010 |

(Continued)

*Primary Examiner* — Eric Nowlin
(74) *Attorney, Agent, or Firm* — Womble Bond Dickinson (US) LLP

(57) ABSTRACT

This application discloses a signal transmission method, including: mapping a first sequence into a first subcarrier group, and mapping a second sequence into a second subcarrier group. The subcarriers included in the first subcarrier group and the second subcarrier group are subcarriers on a same time domain symbol. The subcarriers in each of the first subcarrier group and the second subcarrier group are evenly distributed subcarriers. The first sequence is a Fourier transform sequence of a third sequence. The second sequence is a Fourier transform sequence of a fourth sequence. The elements at a same location in the third sequence and the fourth sequence are not both non-zero elements.

20 Claims, 5 Drawing Sheets

(51) Int. Cl.
*H04W 72/04* (2009.01)
*H04L 5/00* (2006.01)

(52) U.S. Cl.
CPC .......... *H04L 5/0066* (2013.01); *H04L 27/26* (2013.01); *H04L 27/2636* (2013.01); *H04W 72/04* (2013.01); *H04W 72/12* (2013.01)

(56) References Cited

U.S. PATENT DOCUMENTS

| | | | | |
|---|---|---|---|---|
| 8,472,412 | B2* | 6/2013 | Naka | H04J 11/0069 370/335 |
| 8,509,262 | B2* | 8/2013 | Oketani | H04W 72/0406 370/468 |
| 8,724,555 | B2* | 5/2014 | Krishnan | H04L 5/0023 370/208 |
| 8,804,869 | B2* | 8/2014 | Li | H04L 27/2618 375/259 |
| 8,824,575 | B2* | 9/2014 | Kang | H04L 5/0007 375/260 |
| 9,106,288 | B2* | 8/2015 | Ma | H04L 5/0026 |
| 9,137,076 | B2* | 9/2015 | Luo | H04L 5/0023 |
| 9,402,246 | B2* | 7/2016 | Oketani | H04J 13/16 |
| 9,515,762 | B2* | 12/2016 | Oketani | H04J 13/0062 |
| 9,544,173 | B1* | 1/2017 | Berardinelli | H04L 27/2636 |
| 9,787,421 | B2* | 10/2017 | Oketani | H04L 5/0048 |
| 9,924,510 | B2* | 3/2018 | Azizi | H04W 72/0413 |
| 9,967,122 | B2* | 5/2018 | Park | H04L 27/2605 |
| 10,123,358 | B2* | 11/2018 | Fakoorian | H04W 74/0808 |
| 10,263,748 | B2* | 4/2019 | Wang | H04L 5/0051 |
| 10,313,072 | B2* | 6/2019 | Oketani | H04L 5/0048 |
| 10,389,566 | B2* | 8/2019 | Han | H04W 72/0453 |
| 10,412,745 | B2* | 9/2019 | Fodor | H04L 27/2646 |
| 10,419,188 | B2* | 9/2019 | Park | H04J 3/00 |
| 10,439,663 | B2* | 10/2019 | Islam | H04J 13/0074 |
| 10,439,853 | B2* | 10/2019 | Baldemair | H04L 27/2636 |
| 10,454,657 | B2* | 10/2019 | Bhattad | H04L 27/2613 |
| 10,505,684 | B2* | 12/2019 | Oketani | H04J 13/0062 |
| 2006/0072649 | A1* | 4/2006 | Chang | H04B 1/713 375/132 |
| 2009/0103639 | A1 | 4/2009 | Sankabathula et al. | |
| 2009/0238306 | A1* | 9/2009 | Honda | H04L 27/2657 375/329 |
| 2011/0096867 | A1* | 4/2011 | Kang | H04L 5/0007 375/295 |
| 2011/0170509 | A1* | 7/2011 | Naka | H04L 5/005 370/329 |
| 2011/0211488 | A1* | 9/2011 | Kwon | H04L 5/001 370/252 |
| 2012/0106479 | A1* | 5/2012 | Nishio | H04W 72/0446 370/329 |
| 2012/0257690 | A1* | 10/2012 | Li | H04L 27/2618 375/296 |
| 2015/0010097 | A1* | 1/2015 | Ma | H04B 7/0452 375/260 |
| 2015/0195840 | A1* | 7/2015 | Ahn | H04L 5/0037 370/329 |
| 2016/0165598 | A1* | 6/2016 | Azizi | H04W 72/0413 370/336 |
| 2017/0019280 | A1* | 1/2017 | Han | H04L 5/0051 |
| 2017/0207941 | A1* | 7/2017 | Park | H04L 27/2605 |
| 2017/0279569 | A1* | 9/2017 | Wu | H04B 7/04 |
| 2017/0374655 | A1* | 12/2017 | Liu | H04W 28/16 |
| 2018/0069738 | A1* | 3/2018 | Han | H04L 5/0051 |
| 2018/0091350 | A1* | 3/2018 | Akkarakaran | G01S 13/346 |
| 2018/0145854 | A1* | 5/2018 | Akkarakaran | H04L 1/0668 |
| 2018/0184463 | A1* | 6/2018 | Fakoorian | H04W 74/0808 |
| 2018/0206246 | A1* | 7/2018 | Zhang | H04W 74/006 |
| 2018/0241600 | A1* | 8/2018 | Baldemair | H04L 27/2636 |
| 2018/0278394 | A1* | 9/2018 | Wang | H04L 5/0051 |
| 2018/0278397 | A1* | 9/2018 | Park | H04L 5/0048 |
| 2018/0302905 | A1* | 10/2018 | Fodor | H04L 5/0023 |
| 2019/0020522 | A1* | 1/2019 | Sun | H04J 11/00 |
| 2019/0036751 | A1* | 1/2019 | Park | H04L 27/2628 |
| 2019/0297620 | A1* | 9/2019 | Tian | H04W 72/0446 |
| 2019/0342054 | A1* | 11/2019 | Park | H04L 27/2636 |
| 2020/0008204 | A1* | 1/2020 | Matsumura | H04J 13/18 |
| 2020/0014483 | A1* | 1/2020 | Lee | H04L 27/2613 |
| 2020/0014509 | A1* | 1/2020 | Asterjadhi | H04W 72/0453 |
| 2020/0022125 | A1* | 1/2020 | Li | H04W 72/04 |
| 2020/0076558 | A1* | 3/2020 | Kuchi | H04J 13/004 |
| 2020/0145271 | A1* | 5/2020 | Bala | H04L 1/0643 |

FOREIGN PATENT DOCUMENTS

| | | | | |
|---|---|---|---|---|
| CN | 102025681 | A * | 4/2011 | |
| CN | 102035785 | A | 4/2011 | |
| CN | 102113287 | A | 6/2011 | |
| CN | 103227768 | A | 7/2013 | |
| CN | 102025681 | B * | 8/2013 | |
| CN | 104717171 | A | 6/2015 | |
| CN | 105101257 | A | 11/2015 | |
| EP | 2494754 | A2 * | 9/2012 | .......... H04L 5/0037 |
| EP | 2494754 | B1 * | 11/2019 | |
| TW | 201021479 | A | 6/2010 | |
| WO | WO-2011060509 | A1 * | 5/2011 | .......... H04L 27/3411 |
| WO | WO-2018161001 | A1 * | 9/2018 | .......... H04J 13/0025 |

* cited by examiner

SIGNAL TRANSMISSION METHOD, TRANSMIT END, AND RECEIVE END

CROSS-REFERENCE TO RELATED APPLICATIONS

This application is a continuation of International Application No. PCT/CN2017/083078, filed on May 4, 2017, which claims priority to Chinese Patent Application No. 201610311497.8, filed on May 11, 2016. The disclosures of the aforementioned applications are hereby incorporated by reference in their entireties.

TECHNICAL FIELD

This application relates to the communications field, and more specifically, to a signal transmission method, a transmit end, and a receive end.

BACKGROUND

Spectrums are extremely valuable resources in wireless communication. In a modern communications system, for example, a Global System for Mobile Communications (GSM) system, a Code Division Multiple Access (CDMA) 2000 system, a Wideband Code Division Multiple Access (WCDMA) system, and a Long Term Evolution (LTE) system of the 3rd Generation Partnership Project (3GPP), an operating spectrum is usually below 3 GHz. With expansion of smart terminal services, particularly emergence of video services, current spectrum resources already have difficulty in meeting an explosively increasing requirement of a user for a capacity. A high frequency band, particularly a millimeter-wave band, that has higher available bandwidth gradually becomes a candidate frequency band for a next-generation communications system, for example, a frequency band from 3 GHz to 200 GHz.

In addition, in the modern communications system, a multiple-antenna technology is usually used to improve a capacity and coverage of the system, to improve user experience. Using a high frequency band technology in multiple-antenna may greatly reduce a size of a multiple-antenna configuration, to facilitate site obtaining and deployment of more antennas. In the multiple-antenna technology, hybrid beamforming is used to reduce a dimension of a measured reference signal and complexity of a digital data transmission design, and multi-user multiplexing data transmission may be performed through digital beamforming or analog beamforming.

In various multi-user multiplexing technologies, an orthogonal frequency division multiplexing (OFDM) technology is widely applied to downlink signal transmission in the LTE system due to features such as a strong anti-multipath interference capability, simple implementation of discrete Fourier transform, and conduciveness to a multiple-antenna transmission technology.

A discrete Fourier transform spread orthogonal frequency division multiplexing (DFT-S-OFDM) technology may be used in uplink signal transmission in the LTE system. The DFT-S-OFDM technology can implement peak-to-average power ratio (PAPR) performance similar to that of a single carrier signal, and a low PAPR may reduce hardware implementation complexity and costs. When subcarrier groups occupied by different users do not overlap, DFT-S-OFDM may be used to implement orthogonal frequency division multiple access, and a single-carrier orthogonal frequency division multiple access solution is obtained. Therefore, the DFT-S-OFDM technology is particularly applicable to uplink transmission in a mobile communications system.

Single carrier transmission defined in the current LTE system means that a single carrier characteristic is met in time domain, so that a relatively low PAPR can be obtained. It can also be implemented in a frequency domain in two manners: centralized single carrier transmission and distributed single carrier transmission. For centralized single carrier transmission, a sending signal (a data signal or a reference signal) of a user occupies a continuous spectrum (subcarriers in frequency domain are arranged together) in the frequency domain, and the occupied spectrum is a part of entire system bandwidth. For distributed single carrier transmission, a sending signal (a data signal or a reference signal) of a user occupies a discontinuous spectrum in frequency domain. In the prior art, for transmission of a plurality of data signals or reference signals of one user, the data signals and the reference signals (for example, demodulation reference signals (DMRS)) are transmitted in a time division multiplexing manner, to maintain a low PAPR similar to that of the single carrier signal.

However, when the high frequency band technology is used, in some special subframes, the data signal and the reference signal need to be both transmitted on a same time domain symbol. For example, a user needs to both transmit an uplink data signal and an uplink reference signal on the last symbol of a special subframe. In this case, to perform transmission, a plurality of subcarriers on the last symbol may be divided into two subcarrier groups that do not overlap each other, to respectively transmit the uplink data signal and the uplink reference signal. In other words, the plurality of subcarriers are divided into two combs through frequency division, a comb 1 is used to transmit the uplink data signal, and a comb 2 is used to transmit the uplink reference signal.

In the foregoing solution, the data signal and the reference signal can be both transmitted, and transmitting the two signals in an orthogonal frequency division manner can reduce interference between the two signals. However, because the plurality of subcarriers are divided into two combs to both transmit the data signal and the reference signal, the single carrier characteristic is damaged, and consequently a relatively high PAPR is caused.

Moreover, in a prior-art method, multiplexing may also be performed on two time domain signals. For example, a first time domain signal sequence is $f_0, f_1, K f_{M-1}$, denoted as $\{f_i\}$, and a second time domain signal sequence is $g_0, g_1, K g_{M-1}$, denoted as $\{g_i\}$. Before discrete Fourier transform (Discrete Fourier Transform, DFT) is performed, time division multiplexing is performed on the two time domain signal sequences, to form a time domain signal sequence $f_0, g_0, f_1, g_1, K f_{M-1}, g_{M-1}$. If the first time domain signal sequence and the second time domain signal sequence each are a low-PAPR sequence (for example, the two time domain signal sequences each are a time domain waveform in a DFT-S-OFDM form or another low-PAPR single carrier time domain waveform), the foregoing operation may ensure that the time domain signal sequence obtained after time division multiplexing is still a low-PAPR sequence. However, in this solution, there may be relatively high interference after the two sending signals pass through channels.

SUMMARY

This application provides a signal transmission method, a transmit end, and a receive end, so that when at least two signals are transmitted on one symbol, a relatively low PAPR can be ensured, and interference between the signals is relatively low after the signals pass through channels.

According to a first aspect, a signal transmission method is provided, including: mapping, by a transmit end, a first sequence into subcarriers in a first subcarrier group, and mapping, by the transmit end, a second sequence into subcarriers in a second subcarrier group, where there is no identical subcarrier in the first subcarrier group and the second subcarrier group. The subcarriers included in the first subcarrier group and the second subcarrier group are subcarriers on a same time domain symbol. The subcarriers in the first subcarrier group are evenly distributed subcarriers in a subcarrier set. Two adjacent subcarriers in the first subcarrier group are spaced by L−1 subcarriers in the subcarrier set. The subcarriers in the second subcarrier group are evenly distributed subcarriers in the subcarrier set. The adjacent subcarriers in the second subcarrier group are spaced by L−1 subcarriers in the subcarrier set, the first sequence is a Fourier transform sequence of a third sequence. The second sequence is a Fourier transform sequence of a fourth sequence. The elements at a same location in the third sequence and the fourth sequence are not both non-zero elements. The third sequence and the fourth sequence each are a sequence in which at least one element is a non-zero element. The subcarrier set includes LM subcarriers that are evenly distributed in frequency domain, and both L and M are positive integers. The method further includes generating, by the transmit end, a sending signal based on elements on the first subcarrier group and the second subcarrier group; and sending, by the transmit end, the sending signal.

In one embodiment, the subcarriers in the first subcarrier group may be evenly distributed subcarriers that are in the LM subcarriers and have an index spacing L. The subcarriers in the second subcarrier group may be evenly distributed subcarriers that are in the LM subcarriers and have an index spacing L. The LM subcarriers are subcarriers that are evenly distributed in frequency domain, are numbered in ascending or descending order of frequencies, and indexes of the subcarriers are 0 to LM−1.

In the signal transmission method provided in the first aspect, two sequences are constructed in which elements at a same time domain location are not both non-zero elements, and the two sequences are mapped into two different subcarrier groups, so that when at least two signals are transmitted on one symbol, a relatively low PAPR can be ensured, and interference between the signals is relatively low after the signals pass through channels.

Further, when only two signals respectively corresponding to the first sequence and the second sequence are both transmitted on one time domain symbol, the third sequence and the fourth sequence further meet a condition in which elements at a same location are not both zero elements.

Non-zero elements in the third sequence may be evenly distributed, and/or non-zero elements in the fourth sequence may be evenly distributed. Therefore, it can be ensured that a sequence mapped to a frequency domain is characterized by repetition, so that signal amplitude has a relatively small change, to obtain better channel estimation performance.

In one embodiment, before the mapping a first sequence into subcarriers in a first subcarrier group, the method further includes: performing, by the transmit end, first transform on the third sequence to obtain the first sequence, where the first transform is discrete Fourier transform DFT; and/or before the mapping a second sequence into subcarriers in a second subcarrier group, the method further includes: performing, by the transmit end, second transform on the fourth sequence to obtain the second sequence, where the second transform is DFT.

It should be understood that, the first sequence may include M elements, and the second sequence may include M elements. Correspondingly, the third sequence also includes M elements, and the fourth sequence also includes M elements. Therefore, the first transform is M×M DFT, and the second transform is M×M DFT.

In one embodiment, the third sequence is a sequence obtained by performing inverse discrete Fourier transform IDFT on the first sequence, and the fourth sequence is a sequence obtained by performing IDFT transform on the second sequence.

In one embodiment, more signals may be further transmitted on a same time domain symbol, and the method further includes:

mapping, by the transmit end, a fifth sequence into subcarriers in a third subcarrier group, where the fifth sequence is a Fourier transform sequence of a sixth sequence. The subcarriers in the third subcarrier group and the subcarriers included in the first subcarrier group and the second subcarrier group are subcarriers on a same time domain symbol. The elements at a same location in any two of the sixth sequence, the third sequence, and the fourth sequence are not both non-zero elements. The subcarriers in the third subcarrier group are evenly distributed subcarriers in the subcarrier set, where two adjacent subcarriers in the third subcarrier group are spaced by L−1 subcarriers in the subcarrier set. There is no identical subcarrier in the third subcarrier group, the first subcarrier group, and the second subcarrier group. The sixth sequence is a sequence in which at least one element is a non-zero element. Specifically, the subcarriers in the third subcarrier group may be evenly distributed subcarriers that are in the LM subcarriers and have an index spacing L.

In one embodiment, the mapping a first sequence into subcarriers in a first subcarrier group includes: determining the third sequence that includes M elements, where the M elements in the third sequence are $f_0, f_1, K, f_{M-1}$; extending the M elements $f_0, f_1, K, f_{M-1}$ in the third sequence to obtain a sequence $x_0, x_1, K, x_{LM-1}$ whose length is LM, where $$x_i = f_{i \bmod M} \times e^{-j\frac{2\pi i s}{LM}},$$

s is a value in 0, 1, K, L−1, i is a variable, and a value of i is 0, 1, K, LM−1; and performing LM×LM DFT on the third sequence to map the third sequence into M subcarriers in the first subcarrier group in the LM subcarriers.

In addition, another implementation of mapping the first sequence includes: determining the third sequence that includes M elements, where the M elements in the third sequence are $f_0, f_1, K, f_{M-1}$; extending the M elements $f_0, f_1, K, f_{M-1}$ in the third sequence to obtain a sequence $x_0, x_1, K, x_{LM-1}$ whose length is LM, where $$x_i = f_{i \bmod M} \times e^{-j\frac{2\pi \lfloor i/M \rfloor s}{L}},$$

s is a value in 0, 1, K, L+1, i is a variable, and a value of i is 0, 1, K, LM−1; and performing LM×LM DFT on the third sequence to map the third sequence into M subcarriers in the first subcarrier group in the LM subcarriers.

In one embodiment, the mapping a second sequence into subcarriers in a second subcarrier group includes: determining the fourth sequence that includes M elements, where the M elements in the fourth sequence are $g_0, g_1, K, g_{M-1}$; extending the M elements $g_0, g_1, K, g_{M-1}$ in the fourth sequence to obtain a sequence $h_0, h_1, K, h_{LM-1}$ whose length is LM, where $$h_i = g_{i \bmod M} \times e^{-j\frac{2\pi it}{LM}},$$

t is a value in $0, 1, \ldots, L-1$ and t is not equal to s; and performing LM×LM DFT on the fourth sequence to map the fourth sequence into M subcarriers in the first subcarrier group in the LM subcarriers.

In addition, another implementation of mapping the second sequence includes: determining the fourth sequence that includes M elements, where the M elements in the fourth sequence are $g_0, g_1, K, g_{M-1}$; extending the M elements $g_0, g_1, K, g_{M-1}$ in the fourth sequence to obtain a sequence $h_0, h_1, K, h_{LM-1}$ whose length is LM, where $$h_i = g_{i \bmod M} \times e^{-j\frac{2\pi \lfloor i/M \rfloor t}{L}},$$

t is a value in $0, 1, \ldots, L-1$, and t is not equal to s; and performing LM×LM DFT on the fourth sequence to map the fourth sequence into M subcarriers in the first subcarrier group in the LM subcarriers.

In one embodiment, the mapping a second sequence into subcarriers in a second subcarrier group includes: determining the fourth sequence that includes M elements, where the M elements in the fourth sequence are $g_0, g_1, K, g_{M-1}$; and performing M×M DFT on the fourth sequence to obtain the second sequence, and mapping the second sequence into the subcarriers in the second subcarrier group.

According to a second aspect, a signal transmission method is provided, including: receiving, by a receive end, a signal from subcarriers, where the subcarriers are subcarriers on a same time domain symbol; performing, by the receive end, fast Fourier transform FFT on the signal to obtain a first received signal corresponding to a first sequence and a second received signal corresponding to a second sequence, where the first sequence is carried on subcarriers in a first subcarrier group in the subcarriers, and the second sequence is carried on subcarriers in a second subcarrier group in the subcarriers. There is no identical subcarrier in the first subcarrier group and the second subcarrier group. The subcarriers in the first subcarrier group are evenly distributed subcarriers in a subcarrier set, where two adjacent subcarriers in the first subcarrier group are spaced by L−1 subcarriers in the subcarrier set. The subcarriers in the second subcarrier group are evenly distributed subcarriers in the subcarrier set, where two adjacent subcarriers in the second subcarrier group are spaced by L−1 subcarriers in the subcarrier set. The first sequence is a Fourier transform sequence of a third sequence. The second sequence is a Fourier transform sequence of a fourth sequence. The elements at a same location in the third sequence and the fourth sequence are not both non-zero elements. The third sequence and the fourth sequence each are a sequence in which at least one element is a non-zero element, the subcarrier set includes LM subcarriers that are evenly distributed in frequency domain, and both L and M are positive integers. The method further includes performing, by the receive end, signal processing on the first received signal and the second received signal.

In the method in this application, elements at a same time domain location in two sequences corresponding to two signals received on one symbol are not both non-zero elements, and the two sequences are mapped into two different subcarrier groups, so that when two signals are received on one symbol, a relatively low PAPR can be ensured, and interference between the signals is relatively low.

Non-zero elements in the third sequence may be evenly distributed, and/or non-zero elements in the fourth sequence may be evenly distributed.

In one embodiment, the method further includes: receiving, by the receive end, a signal from subcarriers in a third subcarrier group, where the subcarriers in the third subcarrier group and the subcarriers included in the first subcarrier group and the second subcarrier group are subcarriers on a same time domain symbol. The subcarriers in the third subcarrier group are evenly distributed subcarriers in the subcarrier set, where two adjacent subcarriers in the third subcarrier group are spaced by L−1 subcarriers in the subcarrier set. There is no identical subcarrier in the third subcarrier group, the first subcarrier group, and the second subcarrier group. The method further includes performing, by the receive end, FFT on the signal carried on the third subcarrier group, to obtain a third received signal corresponding to a fifth sequence, where the fifth sequence is a Fourier transform sequence of a sixth sequence. The elements at a same location in any two of the sixth sequence, the third sequence, and the fourth sequence are not both non-zero elements. The sixth sequence is a sequence in which at least one element is a non-zero element. The method further includes performing, by the receive end, signal processing on the third received signal.

In one embodiment, the performing, by the receive end, signal processing on the first received signal and the second received signal includes: performing, by the receive end, inverse discrete Fourier transform IDFT on the first received signal to obtain the third sequence; and/or performing, by the receive end, inverse discrete Fourier transform IDFT on the second received signal to obtain the fourth sequence.

In one embodiment, the method further includes: when the first received signal is a data signal, performing a balancing operation on the first received signal.

In one embodiment, the method further includes: when the second received signal is a data signal, performing a balancing operation on the second received signal.

According to a third aspect, a transmit end is provided, including a processing module and a sending module, configured to perform the first aspect and corresponding implementations thereof.

According to a fourth aspect, a transmit end is provided, including a processor, a transceiver, and a memory, configured to perform the first aspect and corresponding implementations thereof. The components of the transmit end in the fourth aspect may be corresponding to corresponding modules of the transmit end in the third aspect.

According to a fifth aspect, a receive end is provided, including a receiving module and a processing module, configured to perform the second aspect and corresponding implementations thereof.

According to a sixth aspect, a receive end is provided, including a processor, a transceiver, and a memory, configured to perform the second aspect and corresponding implementations thereof. The components of the receive end in the sixth aspect may be corresponding to corresponding modules of the receive end in the fifth aspect.

In the aspects and the corresponding embodiments thereof, the first sequence may include M elements: $a_0, a_1, K, a_{M-1}$, and the first sequence may be obtained by extending a base sequence $c_0, c_1, K, c_{K-1}$ whose length is K, where $M=p \times K$, $$a_i = c_{i \bmod K} \times e^{j\frac{2\pi i u}{M}}$$

u is a value in 0, 1, K, p−1, i is a variable, a value of i is 0, 1, K, M−1, and both p and K are positive integers.

In the aspects and the corresponding embodiments thereof, the second sequence may include M elements: $b_0, b_1, K, b_{M-1}$, and the second sequence may be obtained by extending a base sequence $d_0, d_1, K, d_{K-1}$ whose length is K, where $$b_i = d_{i \bmod K} \times e^{j\frac{2\pi i v}{M}},$$

v is a value in 0, 1, K, p−1, and v is not equal to u.

The base sequence corresponding to the first sequence may be obtained by using the following operation: The transmit end performs third transform on a sequence including K non-zero elements in the third sequence, to obtain the base sequence corresponding to the first sequence, where the third transform is K×K discrete Fourier transform DFT.

The base sequence corresponding to the second sequence may be obtained by using the following operation: The transmit end performs fourth transform on K non-zero elements in the fourth sequence, to obtain the base sequence corresponding to the second sequence, where the fourth transform is K×K DFT.

In addition, in the aspects and the corresponding embodiments thereof, the first sequence may be alternatively obtained by using the following method: The first sequence includes M elements: $a_0, a_1, K, a_{M-1}$, and the first sequence is obtained by extending a base sequence $c_0, c_1, K, c_{K-1}$ whose length is K, where $M=p \times K$, $$a_i = c_{i \bmod K} \times e^{j\frac{2\pi \lfloor i/K \rfloor u}{P}},$$

u is a value in 0, 1, ..., p−1, i is a variable, a value of i is 0, 1, K, M−1, and both p and K are positive integers.

Correspondingly, the second sequence may be alternatively obtained by using the following method: The second sequence includes M elements: $b_0, b_1, K, b_{M-1}$, and the second sequence is obtained by extending a base sequence $d_0, d_1, K, d_{K-1}$ whose length is K, where $$b_i = d_{i \bmod K} \times e^{j\frac{2\pi \lfloor i/K \rfloor v}{P}},$$

v is a value in 0, 1, K, p−1, and v is not equal to u.

In the aspects and the corresponding embodiments thereof, the base sequence may be a ZC sequence, a cyclic extension sequence of a ZC sequence, a truncated sequence of a ZC sequence, or a reference signal sequence that meets a standard of an LTE system of the 3GPP.

In this application, the time domain symbol may be an OFDM symbol or a DFT-S-OFDM symbol.

DESCRIPTION OF EMBODIMENTS

Figure 1:
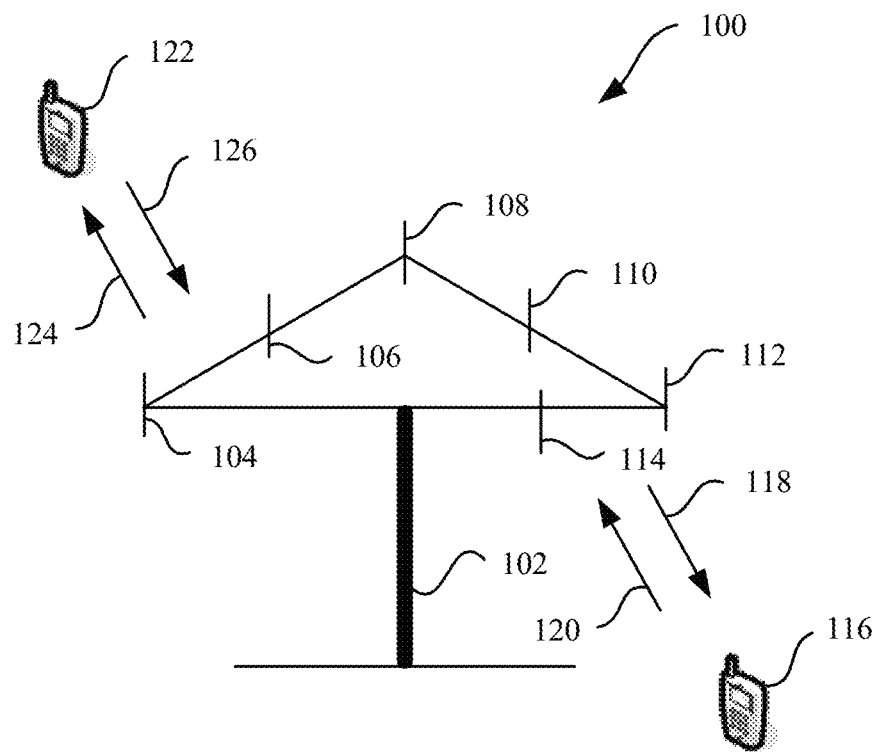
FIG. 1 is a schematic diagram of a signal transmission communications system according to an embodiment of this application.

The following describes technical solutions in this application with reference to the accompanying drawings.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that the technical solutions in the embodiments of this application may be applied to a Long Term Evolution (LTE) architecture, or may be applied to a Universal Mobile Telecommunications System (UMTS) Terrestrial Radio Access Network (UTRAN) architecture, or a Global System for Mobile Communications (GSM)/Enhanced Data rates for GSM Evolution (EDGE) system radio access network (GERAN) architecture. In the UTRAN architecture or the GERAN architecture, a function of an MME is completed by a serving general packet radio service (GPRS) support node (SGSN), and a function of an SGW/

PGW is completed by a gateway GPRS support node (GGSN). The technical solutions in the embodiments of this application may be further applied to another communications system, such as a public land mobile network (PLMN) system or even a future 5G communications system. No limitation is imposed in the embodiments of this application.

The embodiments of this application may be applied to a terminal device. The terminal device may communicate with one or more core networks by using a radio access network (RAN). The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a future 5G network.

The embodiments of this application may also be applied to a network device. The network device may be a device configured to communicate with the terminal device. For example, the network device may be a base transceiver station (BTS) in a GSM system or a CDMA system, may be a NodeB (NB) in a WCDMA system, or may be an evolved NodeB (eNB or eNodeB) in an LTE system.

Alternatively, the network device may be a relay station, an access point, an in-vehicle device, a wearable device, a network side device in a future 5G network, a network device in a future evolved PLMN network, or the like.

In addition, aspects or features of this application may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to a magnetic storage component (for example, a hard disk, a floppy disk, or a magnetic tape), an optical disc (for example, a compact disc (CD) or a digital versatile disc (DVD), and a smart card and a flash memory component (for example, erasable programmable read-only memory (EPROM), a card, a stick, or a key drive). In addition, various storage media described in this specification may indicate one or more devices and/or other machine-readable media for storing information. The term "machine-readable media" may include but is not limited to a radio channel and various other media that can store, contain, and/or carry an instruction and/or data.

FIG. 1 is a schematic diagram of a signal transmission communications system according to an embodiment of this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, processors, modulators, multiplexers, demodulators, demultiplexers, or antennas) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122. The terminal devices 116 and 122 may be, for example, cellular phones, smartphones, portable computers, handheld communications devices, handheld computing devices, satellite radio apparatuses, global positioning systems, PDAs, and/or any other appropriate devices configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (Frequency Division Duplex, FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group that includes a plurality of antennas) and/or area that are/is designed for communication are/is referred to as a sector of the network device 102. For example, the antenna group may be designed to communicate with a terminal device in a sector in coverage of the network device 102. In a process in which the network device 102 respectively communicates with the terminal devices 116 and 122 by using the forward links 118 and 124, beamforming may be used on transmit antenna of the network device 102 to improve signal-to-noise ratios of the forward links 118 and 124. In addition, compared with a manner in which the network device uses a single antenna to send signals to all terminal devices connected to the network device, the beamforming manner causes less interference to a mobile device in a neighboring cell when the network device 102 sends, through beamforming, signals to the terminal devices 116 and 122 that are randomly scattered in related coverage.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive (from another communications apparatus), or store (in a memory)) a specific quantity of data bits that need to be sent to the wireless communications receiving apparatus by using a channel. The data bits may be included in a transport block (or a plurality of transport blocks) of data, and the transport block may be segmented to generate a plurality of code blocks.

It should be understood that the embodiments of this application may be applied to uplink transmission, for example, 120 and 126 shown in FIG. 1, or may be applied to downlink transmission, for example, 118 and 124 shown in FIG. 1. FIG. 1 is only an example of a simplified schematic diagram, and the network may further include another network device that is not shown in FIG. 1.

Spectrums are extremely valuable resources in wireless communication. In a modern communications system, for example, a Global System for GSM, a Code Division Multiple Access (CDMA) 2000 system, a Wideband Code Division Multiple Access (WCDMA) system, and a Long Term Evolution (LTE) system of the 3rd Generation Partnership Project (3GPP), an operating spectrum is usually below 3 GHz. With expansion of smart terminal services, particularly emergence of video services, current spectrum resources already have difficulty in meeting an explosively increasing requirement of a user for a capacity. A high frequency band, particularly a millimeter-wave band, which has a higher available bandwidth gradually becomes a candidate frequency band for a next-generation communications system, for example, a frequency band from 3 GHz to 200 GHz.

In addition, in the modern communications system, a multiple-antenna technology is usually used to improve a capacity and coverage of the system, to improve user experience. Using a high frequency band technology in multiple-antenna may greatly reduce a size of a multiple-antenna configuration, to facilitate site obtaining and deployment of more antennas. In the multiple-antenna technology, hybrid beamforming is used to reduce a dimension of a measured reference signal and complexity of a digital data transmission design, and multi-user multiplexing data transmission may be performed through digital beamforming or analog beamforming.

In various multi-user multiplexing technologies, an orthogonal frequency division multiplexing (OFDM) technology is widely applied to downlink signal transmission in the LTE system due to features such as a strong anti-multipath interference capability, simple implementation of discrete Fourier transform, and conduciveness to a multiple-antenna transmission technology.

A discrete Fourier transform spread orthogonal frequency division multiplexing (DFT-S-OFDM) technology may be used in uplink signal transmission in the LTE system. The DFT-S-OFDM technology can implement peak-to-average power ratio (PAPR) performance similar to that of a single carrier signal, and a low PAPR may reduce hardware implementation complexity and costs. When subcarrier groups occupied by different users do not overlap, DFT-S-OFDM may be used to implement orthogonal frequency division multiple access, and a single-carrier orthogonal frequency division multiple access solution is obtained. Therefore, the DFT-S-OFDM technology is particularly applicable to uplink transmission in a mobile communications system.

Single carrier transmission defined in the current LTE system means that a single carrier characteristic is met in time domain, so that a relatively low PAPR can be obtained. A low PAPR can also be implemented in frequency domain in two manners: centralized single carrier transmission and distributed single carrier transmission. For centralized single carrier transmission, a sending signal (a data signal or a reference signal) of a user occupies a continuous spectrum (subcarriers in frequency domain are arranged together) in frequency domain, and the occupied spectrum is a part of entire system bandwidth. For distributed single carrier transmission, a sending signal (a data signal or a reference signal) of a user occupies a discontinuous spectrum in frequency domain. In the prior art, for transmission of a plurality of data signals or reference signals of one user, the data signals and the reference signals (for example, demodulation reference signals (DMRS)) are transmitted in a time division multiplexing manner, to maintain a low PAPR similar to that of the single carrier signal.

However, when the high frequency band technology is used, in some special subframes, the data signal and the reference signal need to be both transmitted on a same time domain symbol. For example, a user needs to both transmit an uplink data signal and an uplink reference signal on the last symbol of a special subframe. In this case, to perform transmission, a plurality of subcarriers on the last symbol may be divided into two subcarrier groups that do not overlap each other, to respectively transmit the uplink data signal and the uplink reference signal. In other words, the plurality of subcarriers are divided into two combs through frequency division, a comb 1 is used to transmit the uplink data signal, and a comb 2 is used to transmit the uplink reference signal.

In the foregoing solution, the data signal and the reference signal can be both transmitted, and transmitting the two signals in an orthogonal frequency division manner can reduce interference between the two signals. However, because the plurality of subcarriers are divided into two combs to both transmit the data signal and the reference signal, the single carrier characteristic is damaged, and consequently a relatively high PAPR is caused.

Moreover, in a prior-art method, multiplexing may also be performed on two time domain signals. For example, a first time domain signal sequence is $f_0, f_1, K\ f_{M-1}$, denoted as $\{f_i\}$, and a second time domain signal sequence is $g_0, g_1, K\ g_{M-1}$, denoted as $\{g_i\}$. Before discrete Fourier transform (Discrete Fourier Transform, DFT) is performed, time division multiplexing is performed on the two time domain signal sequences, to form a time domain signal sequence $f_0, g_0, f_1, g_1, K\ f_{M-1}, g_{M-1}$. If the first time domain signal sequence and the second time domain signal sequence each are a low-PAPR sequence (for example, the two time domain signal sequences each are a time domain waveform in a DFT-S-OFDM form or another low-PAPR single carrier time domain waveform), the foregoing operation may ensure that the time domain signal sequence obtained after time division multiplexing is still a low-PAPR sequence. However, in this solution, there may be relatively high interference after the two sending signals pass through channels.

Based on the foregoing descriptions, an idea of the embodiments of this application is to provide a signal transmission method, so that when at least two signals are transmitted on one symbol, a relatively low PAPR can be ensured, and interference between the at least two signals can be relatively low after the signals pass through channels.

In the embodiments of this application, a transmit end needs to send Z signals on a same time domain symbol, where Z is greater than or equal to 2. The Z signals may include reference signals or data signals carrying to-be-transmitted information. The signal in this application may be a modulated signal. When the Z signals are transmitted by using a plurality of antennas, spatial precoding (Spatial Precoding) may be further performed before transmission, and different spatial precoding may be performed on different signals.

The method provided in the embodiments of the present invention may include the following operations: The transmit end maps a first sequence into subcarriers in a first subcarrier group, and the transmit end maps a second sequence into subcarriers in a second subcarrier group. There is no identical subcarrier in the first subcarrier group and the second subcarrier group. The subcarriers included in the first subcarrier group and the second subcarrier group are subcarriers on a same time domain symbol. The subcarriers in the first subcarrier group are evenly distributed subcarriers in a subcarrier set, and two adjacent subcarriers in the first subcarrier group are spaced by L−1 subcarriers in the subcarrier set. The subcarriers in the second subcarrier group are evenly distributed subcarriers in the subcarrier set, and two adjacent subcarriers in the second subcarrier group are spaced by L−1 subcarriers in the subcarrier set. The first sequence is a Fourier transform sequence of a third sequence, and the second sequence is a Fourier transform sequence of a fourth sequence. Elements at a same location in the third sequence and the fourth sequence are not both non-zero elements. The third sequence and the fourth sequence each are a sequence in which at least one element is a non-zero element. The subcarrier set includes LM subcarriers that are evenly distributed in frequency domain. Both L and M are positive integers. The transmit end generates a sending signal based on elements on the first subcarrier group and the second subcarrier group. The transmit end sends the sending signal.

Further, when only two signals respectively corresponding to the first sequence and the second sequence are both transmitted on one time domain symbol, the third sequence and the fourth sequence further meet a condition in which elements at a same location are not both zero elements.

The following describes in detail a specific implementation procedure of the method.

First, transmission of any two signals in the Z signals is discussed. The two signals are respectively corresponding to the third sequence and the fourth sequence in time domain. The third sequence and the fourth sequence may be corresponding to a same user, or may be corresponding to different users. The third sequence and the fourth sequence each include M elements. The third sequence may be $f_0, f_1, \ldots f_{M-1}$, denoted as $\{f_i\}$. The fourth sequence may be $g_0, g_1, \ldots g_{M-1}$, denoted as $\{g_i\}$.

Elements at a same location in the third sequence $\{f_i\}$ and the fourth sequence $\{g_i\}$ are not both non-zero elements. Being at a same location means that elements are at a same location in two time domain sequences that each include M elements. In other words, elements at a same moment in the third sequence and the fourth sequence are not both non-zero elements. In this way, in a time domain, it is equivalent to that a base sequence corresponding to the third sequence and a base sequence corresponding to the fourth sequence have a time division multiplexing relationship, so that a sent signal has a low PAPR after a series of subsequent transform such as DFT and IFFT and other processing are performed on the two sequences.

In the embodiments of this application, a frequency domain sequence corresponding to the third sequence $\{f_i\}$ is the first sequence $a_0, a_1, \ldots a_{M-1}$, denoted as $\{a_i\}$, a frequency domain sequence corresponding to the fourth sequence $\{g_i\}$ is the second sequence $b_0, b_1, \ldots b_{M-1}$, denoted as $\{b_i\}$, and the first sequence and the second sequence also each include M elements. In other words, a time domain sequence corresponding to the first sequence is the third sequence, and a time domain sequence corresponding to the second sequence is the fourth sequence. Alternatively, the first sequence is a Fourier transform sequence of the third sequence, and the second sequence is a Fourier transform sequence of the fourth sequence.

In other words, a correspondence between the third sequence and the first sequence is a DFT relationship or an inverse discrete Fourier transform (IDFT) relationship, and a correspondence between the fourth sequence and the second sequence is a DFT relationship or an IDFT relationship. Alternatively, the third sequence is a sequence obtained by performing IDFT on the first sequence, the first sequence is a sequence obtained by performing DFT on the third sequence, the fourth sequence is a sequence obtained by performing IDFT on the second sequence, and the second sequence is a sequence obtained by performing DFT on the fourth sequence.

In the embodiments of this application, the transmit end finally maps the first sequence into M subcarriers in the first subcarrier group, and maps the second sequence into M subcarriers in the second subcarrier group.

It should be noted that, the M subcarriers in the first subcarrier group are evenly distributed subcarriers, and the M subcarriers in the second subcarrier group are evenly distributed subcarriers, so that channel estimation performance can be more balanced, to obtain better channel estimation performance.

There is no identical subcarrier in the first subcarrier group and the second subcarrier group. The 2M subcarriers included in the first subcarrier group and the second subcarrier group are subcarriers on a same time domain symbol. The M subcarriers in the first subcarrier group are evenly distributed subcarriers, and the M subcarriers in the second subcarrier group are evenly distributed subcarriers. In other words, the first sequence and the second sequence are mapped into two combs that do not overlap each other in frequency domain. Therefore, after a signal on the first subcarrier group and a signal on the second subcarrier group pass through channels, interference at a receive side is relatively small, and data transmission performance is ensured.

In the embodiments of this application, the first subcarrier group and the second subcarrier group each may include evenly distributed subcarriers that are in the LM subcarriers and have an index spacing L. The M subcarriers in each subcarrier group are numbered in ascending or descending order of subcarrier frequencies, and indexes of the subcarriers are 0, 1, 2, . . . , M−1, where L is a positive integer. An element $\{x(i)\}$ in the first sequence or the second sequence is mapped into a subcarrier that is in a corresponding subcarrier group and whose index is i, where i=0, 1, 2, . . . , M−1.

The LM subcarriers are also evenly distributed, and a case in which the LM subcarriers are consecutively distributed (in this case, a spacing is 1) is included. The LM subcarrier may be numbered in ascending or descending order of frequencies, and indexes of the subcarrier are 0 to LM−1. Based on the indexes of the LM subcarriers, "index spacing is L" means that a difference between two indexes is L. For example, indexes of M evenly distributed subcarriers having an index spacing L are {k, k+L, k+2L, . . . , k+(M−1)L}, where k is an element in {0, 1, 2, . . . , L−1}.

In other words, the subcarrier set includes LM subcarriers that are evenly distributed in frequency domain. The subcarriers in the first subcarrier group may be evenly distributed subcarriers that are in the LM subcarriers and have an index spacing L. The subcarriers in the second subcarrier group may be evenly distributed subcarriers that are in the LM subcarriers and have an index spacing L. The LM subcarriers are subcarriers that are evenly distributed in frequency domain, are numbered in ascending or descending order of frequencies, and indexes of the subcarriers are 0 to LM−1. For ease of description, the LM subcarriers are numbered in the embodiments of this application, and no limitation is imposed in the embodiments of this application.

Optionally, in the embodiments of this application, non-zero elements in the third sequence may be evenly distributed, and/or non-zero elements in the fourth sequence may be evenly distributed. In other words, non-zero elements in time domain in at least one of the two signals discussed in the embodiments of this application are evenly distributed. Therefore, it is ensured that a sequence mapped to a frequency domain is characterized by repetition with phase rotation, so that signal amplitude has a relatively small change, to obtain better channel estimation performance.

In one embodiment, non-zero elements in the third sequence may be consecutively distributed, and/or non-zero elements in the fourth sequence are consecutively distributed. For example, the non-zero elements in the third sequence are the first M1 elements, the non-zero elements in the fourth sequence are the last M2 elements, and M1+M2=M, where M1 and M2 are positive integers. Therefore, it can also be ensured that a finally transmitted signal is characterized by a relatively good PAPR.

The third sequence is used as an example for description. The evenly distributed non-zero elements in the third sequence $\{f_i\}$ may be non-zero elements $f_0$, $f_2$, $f_4$, K, non-zero elements $f_1$, $f_3$, $f_5$, K, non-zero elements $f_0$, $f_3$, $f_6$, K, or the like. A specific manner in which non-zero elements are evenly distributed is not limited in the embodiments of this application.

Figure 2:
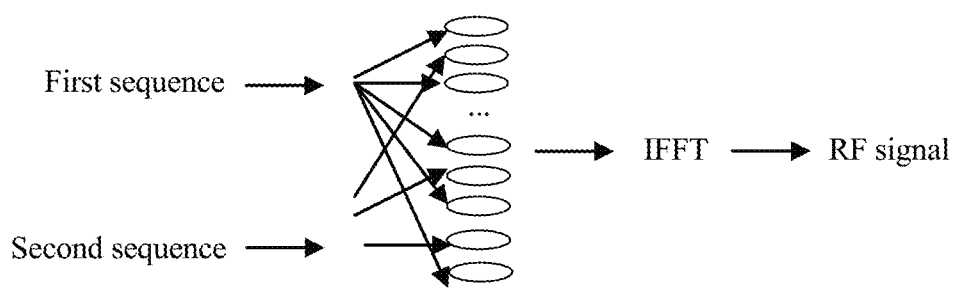
FIG. 2 is a schematic diagram of a signal transmission method according to an embodiment of this application.

As shown in FIG. 2, after respectively mapping the first sequence and the second sequence into the first subcarrier group and the second subcarrier group, the transmit end transforms the elements on the 2M subcarriers to a time domain, generates a sending signal, and sends the sending signal. Specifically, the transmit end may convert the elements on the 2M subcarriers into a time domain signal through IFFT transform, and send the signal.

In the embodiments of this application, elements at a same location in the third sequence and the fourth sequence are not both non-zero elements, to ensure that the finally transmitted time domain signal does not have an obvious PAPR due to superposition of the two signals in time domain. A reason is as follows: It can be learned from signal processing knowledge that, the finally transmitted signal is a signal obtained after repetition with phase rotation is performed on the original third signal and fourth signal, and repetition with phase rotation does not affect a characteristic in which the elements are not both non-zero elements.

In the embodiments of this application, the transmit end needs to send Z signals on a same time domain symbol, where Z is greater than or equal to 2. Any two signals in the Z signals may have a plurality of combinations, and these combinations may be applied to the embodiments of this application. For example, any two signals may be both reference signals, or may be a combination of a reference signal and a signal of control information carried on a control channel, or may be a combination of a reference signal and a data signal carried on a data channel, or may be a combination of a reference signal and a signal that carries other to-be-transmitted information, or may be a combination of any two signals other than the reference signal in the foregoing signals.

It should be understood that, in the embodiments of this application, the time domain symbol may be an OFDM symbol or a DFT-S-OFDM symbol.

In the embodiments of this application, L may be greater than or equal to Z. Correspondingly, elements in Z sequences corresponding to the Z signals are finally mapped into Z subcarrier groups in the LM subcarriers (corresponding to L subcarrier groups). A function of L-Z subcarrier groups other than the Z subcarrier groups in the L subcarrier groups is not limited.

The reference signal may be an uplink reference signal or a downlink reference signal. For example, the reference signal may be a demodulation reference signal (DMRS), a cell-specific reference signal (CRS), a channel state information—reference signal (CSI-RS), a sounding reference signal (SRS), or the like. No limitation is imposed in the embodiments of this application.

Correspondingly, the control information may be uplink control information carried on an uplink control channel, for example, uplink control information carried on a physical uplink control channel (PUCCH), or may be downlink control information carried on a downlink control channel, for example, downlink control information carried on a physical downlink control channel (PDCCH).

The data channel may be an uplink data channel such as a physical uplink shared channel (PUSCH), or may be a downlink data channel such as a physical downlink shared channel (PDSCH).

In addition, the other to-be-transmitted information may include system information carried on a broadcast channel, for example, information carried on a physical broadcast channel (PBCH), or a synchronization signal used for synchronization, for example, a primary synchronization signal (PSS) or a secondary synchronization signal (SSS), or two signals in a secondary synchronization signal, or the like.

The first sequence $\{a_i\}$ may be a sequence obtained by performing phase rotation on an extended base sequence. Similarly, the second sequence $\{b_i\}$ may also be obtained by performing phase rotation on an extended base sequence. The base sequence may be a ZC sequence (a Zadoff-Chu sequence), a cyclic extension sequence of a ZC sequence, a truncated sequence of a ZC sequence, or a reference signal sequence that meets a standard of a Long Term Evolution LTE system of the 3rd Generation Partnership Project (3rd Generation Partnership Project, 3GPP).

The cyclic extension sequence of the ZC sequence and the truncated sequence of the ZC sequence are described by using the following example. A length of an uplink reference signal in the LTE system is usually an integer multiple of an RB, to be specific, an integer multiple of 12. However, a ZC sequence used to generate the reference signal is not necessarily an integer multiple of 12. When a length of the ZC sequence is less than the length of the reference signal, a sequence of the reference signal is generated by performing cyclic extension on the ZC sequence. When a length of the ZC sequence is greater than the length of the reference signal, a sequence of the reference signal is generated by truncating the ZC sequence. For example, if a length of a ZC sequence $X_i$ is M and a length of a reference signal $Y_i$ is N, when M<N, $Y_i = X_{i \bmod M}$, where i=0, 1, K, N−1; or when M>N, $Y_i = X_i$, where i=0, 1, K, N−1.

In a specific example, the base sequence may be obtained by performing cyclic extension on the ZC sequence. The ZC sequence has good correlation, also referred to as a cyclic shift characteristic. In other words, any original ZC sequence does not correlate with a sequence obtained through n cyclic shifts of the ZC sequence, or an autocorrelation peak is sharp. The ZC sequence is characterized by good cross-correlation, and a cross-correlation value is close to zero. The ZC sequence has a low PAPR. Any ZC sequence on which fast Fourier transform (FFT) or inverse fast Fourier transform (IFFT) is performed is still a ZC sequence. It should be understood that, the base sequence may be generated by using another constant amplitude zero autocorrelation (CAZAC) sequence different from the ZC sequence, and the like. The base sequence may be another sequence characterized by a low PAPR. No limitation is imposed in the embodiments of this application.

Specifically, the first sequence includes M elements: $a_0$, $a_1$, K, $a_{M-1}$, and the first sequence is obtained by extending a base sequence $c_0$, $c_1$, K, $c_{K-1}$ whose length is K, where M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

The second sequence includes M elements: $b_0$, $b_1$, K, $b_{M-1}$, and the second sequence is obtained by extending a base sequence $d_0$, $d_1$, K, $d_{K-1}$ whose length is K, where $$b_i = d_{i \bmod K} \times e^{j\frac{2\pi i v}{M}},$$

v is a value in 0, 1, K, p−1, and v is not equal to u.

Optionally, the length of the base sequence corresponding to the first sequence and the length of the base sequence corresponding to the second sequence may be unequal. For example, the length of the base sequence corresponding to the first sequence is $K_1$, the length of the base sequence corresponding to the second sequence is $K_2$, and $K_1$ is a non-zero integer multiple of $K_2$.

Similarly, in another implementation, the first sequence includes M elements: $a_0$, $a_1$, K, $a_{M-1}$, and the first sequence is obtained by extending a base sequence $c_0$, $c_1$, K, $c_{K-1}$ whose length is K, where M=p×K, $$a_i = c_{i \bmod K} \times e^{j\frac{2\pi \lfloor i/K \rfloor u}{p}},$$

u is a value in 0, 1, . . . , p−1, i is a variable, a value of i is 0, 1, K, M−1, and both p and K are positive integers.

The second sequence includes M elements: $b_0$, $b_1$, K, $b_{M-1}$, and the second sequence is obtained by extending a base sequence $d_0$, $d_1$, K, $d_{K-1}$ whose length is K, where $$b_i = d_{i \bmod K} \times e^{j\frac{2\pi \lfloor i/K \rfloor v}{p}},$$

v is a value in 0, 1, K, p−1, and v is not equal to u.

In the embodiments of this application, two base sequences $\{c_i\}$ and $\{d_i\}$ whose lengths are K are defined, and each may be obtained by performing cyclic extension on a ZC sequence.

The base sequence may carry information that needs to be sent. For example, a sequence obtained after the sequence $\{c_i\}$ is multiplied by modulated symbol information x is used as the base sequence corresponding to the first sequence, or a sequence obtained after the sequence $\{d_i\}$ is multiplied by modulated symbol information y is used as the base sequence corresponding to the second sequence.

A reference signal sequence in the current LTE system may be used as the base sequence. A ZC sequence $\{z_i\}$ may be specifically represented in the following form:

$$z_i = \begin{cases} \exp\left(-j2\pi q \cdot \frac{i(i+1)/2 + l \cdot i}{Q}\right), & Q \text{ is odd}, i = 0, 1, 2, \ldots, Q-1 \\ \exp\left(-j2\pi q \cdot \frac{i^2/2 + l \cdot i}{Q}\right), & Q \text{ is even}, i = 0, 1, 2, \ldots, Q-1 \end{cases}$$

Q is a length of the ZC sequence, q is a natural number that is relatively prime to Q, different q values are corresponding to different ZC sequences, and l is a cyclic shift value of each ZC sequence. For example, when Q=3, a value of q may be 1 or 2, and two basic ZC sequences are ZC (3, 1, 1) and ZC (3, 2, 1). "Q is odd" means that Q is an odd number, and "Q is even" means that Q is an even number.

A sequence, whose length is M, obtained by extending the base sequence $\{c_i\}$ whose length is K is the first sequence $\{a_i\}$. A sequence, whose length is M, obtained by extending the base sequence $\{d_i\}$ whose length is K is the second sequence $\{b_i\}$.

Figure 3:
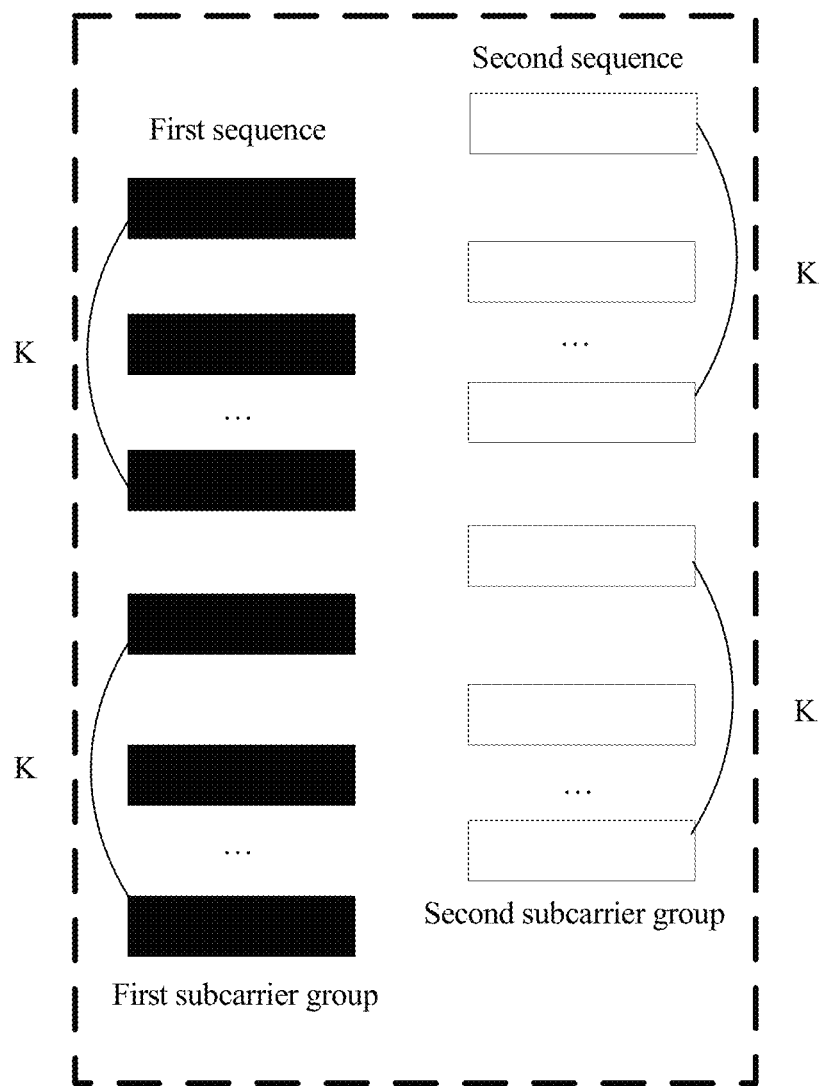
FIG. 3 is a schematic diagram of a signal transmission method according to another embodiment of this application.

As shown in FIG. 3, the M elements $a_0$, $a_1$, K, $a_{M-1}$ elements in the first sequence $\{a_i\}$ are mapped into the first subcarrier group in the LM subcarriers, and the M elements $b_0$, $b_1$, K, $b_{M-1}$ in the second sequence $\{b_i\}$ are mapped into the second subcarrier group in the LM subcarriers. The transmit end transforms the elements on the 2M subcarriers to the time domain, and generates a sending signal, namely, a radio frequency (Radio Frequency, RF) signal. Finally, the transmit end sends the RF signal.

The first sequence and the second sequence meet a characteristic of extension with phase rotation (extension and phase rotation). In this case, the time domain sequences (the third sequence and the fourth sequence) corresponding to the first sequence and the second sequence meet a characteristic in which the elements are not both non-zero elements, so that the finally transmitted signal obtained through superposition is characterized by a good PAPR.

Figure 4:
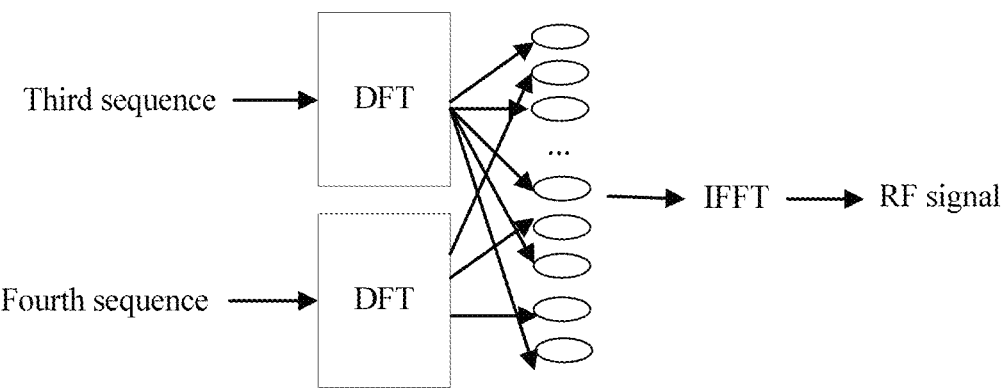
FIG. 4 is a schematic diagram of a signal transmission method according to still another embodiment of this application.

In another embodiment of this application, one signal in the two signals is corresponding to the third sequence, and the other signal is corresponding to the fourth sequence. The method shown in FIG. 4 may be used to map the third sequence into the first subcarrier group and map the fourth sequence into the second subcarrier group. After the third sequence and the fourth sequence are obtained, M×M DFT is performed on the third sequence to map the sequence into the first subcarrier group, and M×M DFT is performed on the fourth sequence to map the sequence into the second subcarrier group.

In addition, in another method, a sequence including K non-zero elements in the third sequence is obtained, K×K DFT is performed on the sequence including the K non-zero elements, to obtain a base sequence corresponding to the first sequence, and the base sequence is extended to obtain the first sequence. A sequence including K non-zero elements in the fourth sequence is obtained, K×K DFT is performed on the sequence including the K non-zero elements, to obtain a base sequence corresponding to the second sequence, and the base sequence is extended to obtain the second sequence. The extension method is the same as the method for extending a base sequence in the foregoing embodiment, and details are not described herein again.

In other words, the base sequence corresponding to the first sequence may be obtained by using the following step: The transmit end performs third transform on the sequence including the K non-zero elements in the third sequence, to obtain the base sequence corresponding to the first sequence, where the third transform is K×K discrete Fourier transform DFT.

The base sequence corresponding to the second sequence may be obtained by using the following step: The transmit end performs fourth transform on the K non-zero elements in the fourth sequence, to obtain the base sequence corresponding to the second sequence, where the fourth transform is K×K DFT.

It should be understood that, the K non-zero elements in the third sequence and the K non-zero elements in the fourth sequence may be considered as sequence elements corresponding to to-be-sent information.

In the embodiments of this application, a specific step of obtaining the first sequence by using the third sequence may be a step of using the K non-zero elements in the third sequence to obtain the base sequence that includes K elements and that is of the first sequence; and/or a specific step of obtaining the second sequence by using the fourth sequence may be a step of using the K non-zero elements in the fourth sequence to obtain the base sequence that includes K elements and that is of the second sequence. In other words, in the embodiments of this application, the first sequence may be obtained by performing DFT on the third sequence, to be specific, the third sequence is first extended in time domain and then transformed to the frequency domain; or may be obtained by first transforming the base sequence of the third sequence to the frequency domain and then performing extension in frequency domain. No limitation is imposed in the embodiments of this application. Regardless of a manner in which the first sequence and the second sequence (corresponding frequency domain sequences) or the third sequence and the fourth sequence (corresponding time domain sequences) are obtained, the sequence meets the foregoing time or frequency domain requirement on the sequence.

Specifically, before the first sequence is mapped into the subcarriers in the first subcarrier group, the method further includes: performing, by the transmit end, first transform on the third sequence to obtain the first sequence, where the first transform is discrete Fourier transform DFT; and/or before the second sequence is mapped into the subcarriers in the second subcarrier group, the method further includes: performing, by the transmit end, second transform on the fourth sequence to obtain the second sequence, where the second transform is DFT.

It should be understood that, the first sequence may include M elements, and the second sequence may include M elements. Correspondingly, the third sequence also includes M elements, and the fourth sequence also includes M elements. Therefore, the first transform is M×M DFT, and the second transform is M×M DFT.

In addition, mapping may be further performed in the following manner. For mapping of the first sequence, the transmit end determines the third sequence that includes M elements, where the M elements in the third sequence are $f_0$, $f_1$, K, $f_{M-1}$; extends the M elements $f_0$, $f_1$, K, $f_{M-1}$ in the third sequence to obtain a sequence $x_0$, $x_1$, K, $x_{LM-1}$ whose length is LM, where $$x_i = f_{i \bmod M} \times e^{-j\frac{2\pi i s}{LM}},$$

s is a value in 0, 1, K, L−1, i is a variable, and a value of i is 0, 1, K, LM−1; and performs LM×LM DFT on the third sequence to map the third sequence into M subcarriers in the first subcarrier group in the LM subcarriers.

A sequence obtained after LM×LM DFT is a sequence including LM elements. However, because elements only on M subcarriers are non-zero elements, although the sequence including LM elements is mapped into the LM subcarriers, this is actually consistent with the foregoing description: The M elements in the first sequence are mapped into M subcarriers and the M elements in the second sequence are mapped into M other subcarriers. Details are not described again in this application. A subcarrier group that includes M subcarriers and into which the sequence is mapped depends on values of s and t.

In one embodiment, another implementation of mapping the first sequence includes the following operations: The transmit end determines the third sequence that includes M elements, where the M elements in the third sequence are $f_0$, $f_1$, K, $f_{M-1}$; extends the M elements $f_0$, $f_1$, K, $f_{M-1}$ in the third sequence to obtain a sequence $x_0$, $x_1$, K, $x_{LM-1}$ whose length is LM, where $$x_i = f_{i \bmod M} \times e^{-j\frac{2\pi \lfloor i/M \rfloor s}{L}},$$

s is a value in 0, 1, K, L−1, i is a variable, and a value of i is 0, 1, K, LM−1; and performs LM×LM DFT on the third sequence to map the third sequence into M subcarriers in the first subcarrier group in the LM subcarriers.

For mapping of the second sequence, the transmit end determines the fourth sequence that includes M elements, where the M elements in the fourth sequence are $g_0$, $g_1$, K, $g_{M-1}$; extends the M elements $g_0$, $g_1$, K, $g_{M-1}$ in the fourth sequence to obtain a sequence $h_0$, $h_1$, K, $h_{LM-1}$ whose length is LM, where $$h_i = g_{i \bmod M} \times e^{-j\frac{2\pi i t}{LM}},$$

t is a value in 0, 1, . . . , L−1, and t is not equal to s; and performs LM×LM DFT on the fourth sequence to map the fourth sequence into M subcarriers in the first subcarrier group in the LM subcarriers.

In one embodiment, another implementation of mapping the second sequence includes the following operations: The transmit end determines the fourth sequence that includes M elements, where the M elements in the fourth sequence are $g_0$, $g_1$, K, $g_{M-1}$; extends the M elements $g_0$, $g_1$, K, $g_{M-1}$ in the fourth sequence to obtain a sequence $h_0$, $h_1$, K, $h_{LM-1}$ whose length is LM, where $$h_i = g_{i \bmod M} \times e^{-j\frac{2\pi \lfloor i/M \rfloor t}{L}},$$

t is a value in 0, 1, . . . , L−1, and t is not equal to s; and performs LM×LM DFT on the fourth sequence to map the fourth sequence into M subcarriers in the first subcarrier group in the LM subcarriers.

A sequence obtained after LM×LM DFT is a sequence including LM elements. However, because elements only on M subcarriers are non-zero elements, although the sequence including LM elements is mapped into the LM subcarriers, this is actually consistent with the foregoing description: The M elements in the first sequence are mapped into M subcarriers and the M elements in the second sequence are mapped into M other subcarriers. Details are not described again in this application. A subcarrier group that includes M subcarriers and into which the sequence is mapped depends on values of s and t.

Figure 5:
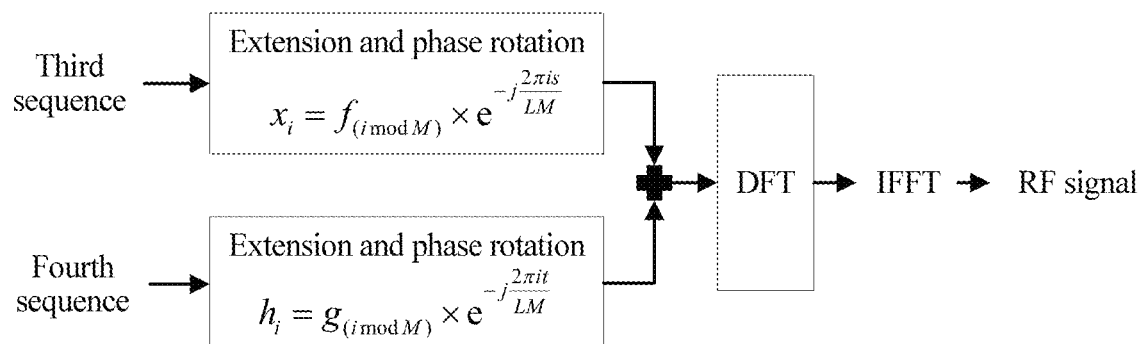
FIG. 5 is a schematic diagram of a signal transmission method according to still another embodiment of this application.

As shown in FIG. 5, the foregoing mapping manner is performing LM×LM DFT on each of the third sequence and the fourth sequence and then mapping each of the sequences into M subcarriers in the LM subcarriers. A variant implementation is as follows: The transmit end adds an extension sequence of the third sequence and an extension sequence of the fourth sequence to obtain a sum sequence, performs LM×LM DFT on the sum sequence to obtain a sequence whose length is LM, and maps the sequence into the LM subcarriers. The LM subcarriers include the first subcarrier group and the second subcarrier group. Then, the transmit end performs IFFT transform on the signals on the LM subcarriers to obtain a time domain signal, and sends the time domain signal. An element in the sum sequence $\{x(i)\}$ is mapped into a subcarrier whose number is i, where i=0, 1, 2, . . . , LM−1, and numbers of the LM subcarriers in descending or ascending order of frequencies are 0 to LM−1. A characteristic in which non-zero elements in sequences whose lengths are M are not both zero is still applicable to a sequence whose length is LM after extension, in other words, extension does not affect the characteristic in which the non-zero elements are not both zero. Therefore, a time domain sequence whose length is LM and that is obtained through IFFT still has a relatively low PAPR.

Figure 6:
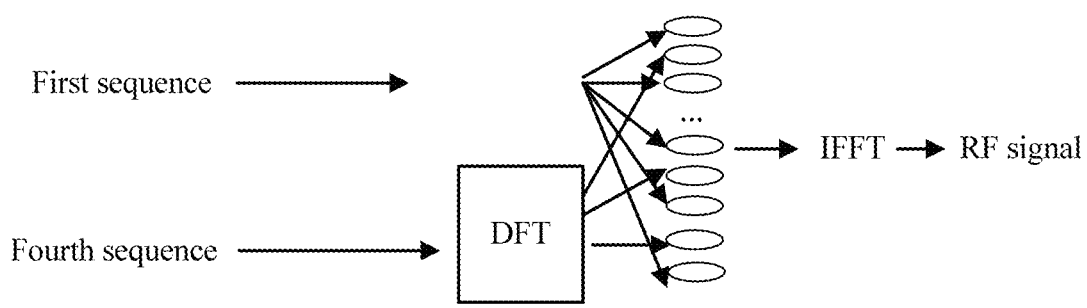
FIG. 6 is a schematic diagram of a signal transmission method according to still another embodiment of this application.

In one embodiment, one signal in the two signals is a reference signal, the other signal is a data signal, and there is another mapping manner shown in FIG. 6: The transmit ends maps the first sequence corresponding to the reference signal into the M subcarriers in the first subcarrier group in the LM subcarriers; determines the fourth sequence that includes M elements, where the M elements in the fourth sequence are $g_0$, $g_1$, K, $g_{M-1}$; performs M×M DFT on the fourth sequence to obtain the second sequence; and maps the second sequence into the subcarriers in the second subcarrier group. The transmit end performs K×K DFT on the K non-zero elements in the fourth sequence to obtain the base sequence of the second sequence, to obtain the second sequence, and maps the second sequence into the M subcarriers in the second subcarrier group.

The two signals and their respective first subcarrier group and second subcarrier group in the LM subcarriers are discussed. In addition to this, a third subcarrier group may further exist in the LM subcarriers, is used to send another signal, and is corresponding to a third frequency domain signal. The transmit end maps a fifth sequence into subcarriers in the third subcarrier group. The fifth sequence is a Fourier transform sequence of a sixth sequence. The subcarriers in the third subcarrier group and the subcarriers included in the first subcarrier group and the second subcarrier group are subcarriers on a same time domain symbol. Elements at a same location in any two of the sixth sequence, the third sequence, and the fourth sequence are not both non-zero elements. The subcarriers in the third subcarrier group are evenly distributed subcarriers in the subcarrier set. Two adjacent subcarriers in the third subcarrier group are spaced by L−1 subcarriers in the subcarrier set. There is no same subcarrier in the third subcarrier group, the first subcarrier group, and the second subcarrier group. The sixth sequence is a sequence in which at least one element is a non-zero element.

The sixth sequence corresponding to the signal on the third subcarrier group and the third sequence and the fourth sequence that are respectively corresponding to the signals on the first subcarrier group and the second subcarrier group also meet a time division multiplexing characteristic. The signal on the third subcarrier group may be a data signal or a reference signal.

In the foregoing embodiments, any two subcarrier groups in L (L≥2) subcarrier groups are used as an example for description. The first subcarrier group is corresponding to a subcarrier group in the L subcarrier groups. Similarly, the second subcarrier group is corresponding to another subcarrier group in the L subcarrier groups. A signal on each subcarrier group is corresponding to one signal in frequency division multiplexing. Signals on the L subcarrier groups are corresponding to multiplexing of L frequency domain signals. Time domain sequences respectively corresponding to the L signals meet a characteristic in which elements at a same location are not both non-zero elements.

In the embodiments of this application, the LM subcarriers may be all subcarriers on entire bandwidth, or may be some subcarriers on entire bandwidth. Preferably, the LM subcarriers are LM subcarriers that are evenly distributed in frequency domain. In this way, remaining subcarriers on the time domain symbol may be further used to carry another signal. In other words, the signals carried on the LM subcarriers and the another signal may also be sent on the same time domain symbol in a frequency division multiplexing manner.

The following uses several specific examples to describe the method in the embodiments of this application.

EXAMPLE 1

The transmit end determines two pieces of to-be-sent information: first to-be-sent information and second to-be-sent information. A sequence corresponding to the first to-be-sent information is (a1, a2), and a sequence corresponding to the second to-be-sent information is (b3, b4). A sequence (a1, 0, a2, 0) is obtained by inserting zeros into the sequence (a1, a2), and a sequence (0, b3, 0, b4) is obtained by inserting zeros into the sequence (b3, b4), where a1, a2, b3, and b4 are non-zero elements. Elements at a same location in the sequence (a1, 0, a2, 0) and the sequence (0, b3, 0, b4) are not both non-zero elements.

A sequence (X1, X2, X3, X4) may be obtained by performing DFT on the sequence (a1, 0, a2, 0), and a sequence (Y1, Y2, Y3, Y4) may be obtained by performing DFT on the sequence (0, b3, 0, b4). The sequence (X1, X2, X3, X4) and the sequence (Y1, Y2, Y3, Y4) are respectively mapped into two subcarrier groups. Subcarriers included in the two subcarrier groups are subcarriers on a same time domain symbol, the subcarriers included in each of the two subcarrier groups are evenly distributed subcarriers, and the spacing is 2.

Alternatively, a sequence (a1, a2, 0, 0) is obtained by inserting zeros into the sequence (a1, a2), and a sequence (0, 0, b3, b4) is obtained by inserting zeros into the sequence (b3, b4), where a1, a2, b3, and b4 are non-zero elements. Elements at a same location in the sequence (a1, a2, 0, 0) and the sequence (0, 0, b3, b4) are not both non-zero elements.

A sequence (X1', X2', X3', X4') may be obtained by performing DFT on the sequence (a1, a2, 0, 0), and a sequence (Y1', Y2', Y3', Y4') may be obtained by performing DFT on the sequence (0, 0, b3, b4). The sequence (X1', X2', X3', X4') and the sequence (Y1', Y2', Y3', Y4') are respectively mapped into two subcarrier groups.

Alternatively, a sequence (a1, 0, a2, 0, a1, 0, a2, 0) may be obtained by extending and performing phase rotation on the sequence (a1, 0, a2, 0), and a sequence (0, b3, 0, b4, 0, −b3, 0, −b4) may be obtained by extending and performing phase rotation on the sequence (0, b3, 0, b4). A sequence (X1, 0, X2, 0, X3, 0, X4, 0) is obtained by performing DFT on the sequence (a1, 0, a2, 0, a1, 0, a2, 0), and a sequence (0, Y1, 0, Y2, 0, Y3, 0, Y4) is obtained by performing DFT on the sequence (0, b3, 0, b4, 0, −b3, 0, −b4). The sequence (X1, 0, X2, 0, X3, 0, X4, 0) and the sequence (0, Y1, 0, Y2, 0, Y3, 0, Y4) are respectively mapped into eight consecutive subcarriers on a same time domain symbol.

Alternatively, the sequence (a1, 0, a2, 0, a1, 0, a2, 0) and the sequence (0, b3, 0, b4, 0, −b3, 0, −b4) are added to obtain a sequence (a1, b3, a2, b4, a1, −b3, a2, −b4). After DFT is performed on the sequence (a1, b3, a2, b4, a1, −b3, a2, −b4), a sequence (X1, Y1, X2, Y2, X3, Y3, X4, Y4) may be obtained, and directly mapping the sequence (X1, Y1, X2, Y2, X3, Y3, X4, Y4) into eight consecutive subcarriers may also obtain the foregoing result.

EXAMPLE 2

The transmit end determines three pieces of to-be-sent information: first to-be-sent information, second to-be-sent information, and third to-be-sent information. A sequence corresponding to the first to-be-sent information is (a1, a2), a sequence corresponding to the second to-be-sent information is (b3, b4), and a sequence corresponding to the third to-be-sent information is (c5, c6). A sequence (a1, 0, 0, a2, 0, 0) is obtained by inserting zeros into the sequence (a1, a2), a sequence (0, b3, 0, 0, b4, 0) is obtained by inserting zeros into the sequence (b3, b4), and a sequence (0, 0, c5, 0, 0, c6) is obtained by inserting zeros into the sequence (c5, c6). Elements at a same location in the sequence (a1, 0, 0, a2, 0, 0), the sequence (0, b3, 0, 0, b4, 0), and the sequence (0, 0, c5, 0, 0, c6) are not both non-zero elements.

A sequence (X1, X2, X3, X4, X5, X6) is obtained by performing DFT on the sequence (a1, 0, 0, a2, 0, 0), a sequence (Y1, Y2, Y3, Y4, Y5, Y6) is obtained by performing DFT on the sequence (0, b3, 0, 0, b4, 0), and a sequence (Z1, Z2, Z3, Z4, Z5, Z6) is obtained by performing DFT on the sequence (0, 0, c5, 0, 0, c6). The sequence (X1, X2, X3, X4, X5, X6), the sequence (Y1, Y2, Y3, Y4, Y5, Y6), and the sequence (Z1, Z2, Z3, Z4, Z5, Z6) are respectively mapped into three subcarrier groups. Subcarriers included in the three subcarrier groups are subcarriers on a same time domain symbol, the subcarriers included in each of the three subcarrier groups are evenly distributed subcarriers, and the spacing is 3.

Alternatively, a sequence (a1, 0, 0, a2, 0, 0, a1, 0, 0, a2, 0, 0, a1, 0, 0, a2, 0, 0) is obtained by extending and performing phase rotation on the sequence (a1, 0, 0, a2, 0, 0), a sequence $$\left(0, b3, 0, 0, b4, 0, 0, b3 \times e^{-j\frac{2\pi}{3}}, 0, 0,\right.$$
$$\left. b4 \times e^{-j\frac{2\pi}{3}}, 0, 0, b3 \times e^{-j\frac{2 \times 2\pi}{3}}, 0, 0, b4 \times e^{-j\frac{2 \times 2\pi}{3}}, 0\right)$$

is obtained by extending and performing phase rotation on the sequence (0, b3, 0, 0, b4, 0), and a sequence $$\left(0, 0, c5, 0, 0, c6, 0, 0, c5 \times e^{-j\frac{4\pi}{3}}, 0, 0,\right.$$
$$\left. c6 \times e^{-j\frac{4\pi}{3}}, 0, 0, c5 \times e^{-j\frac{2 \times 4\pi}{3}}, 0, 0, c6 \times e^{-j\frac{2 \times 4\pi}{3}}\right)$$

is obtained by extending and performing phase rotation on the sequence (0, 0, c5, 0, 0, c6). A sequence (X1, 0, 0, X2, 0, 0, X3, 0, 0, X4, 0, 0, X5, 0, 0, X6, 0, 0) is obtained by performing DFT on the sequence (a1, 0, 0, a2, 0, 0, a1, 0, 0, a2, 0, 0, a1, 0, 0, a2, 0, 0). A sequence (0, Y1, 0, 0, Y2, 0, 0, Y3, 0, 0, Y4, 0, 0, Y5, 0, 0, Y6, 0) is obtained by performing DFT on the sequence $$\left(0, b3, 0, 0, b4, 0, 0, b3 \times e^{-j\frac{2\pi}{3}}, 0, 0,\right.$$
$$\left. b4 \times e^{-j\frac{2\pi}{3}}, 0, 0, b3 \times e^{-j\frac{2 \times 2\pi}{3}}, 0, 0, b4 \times e^{-j\frac{2 \times 2\pi}{3}}, 0\right)$$

A sequence (0, 0, Z1, 0, 0, Z2, 0, 0, Z3, 0, 0, Z4, 0, 0, Z5, 0, 0, Z6) is obtained by performing DFT on the sequence $$\left(0, 0, c5, 0, 0, c6, 0, 0, c5 \times e^{-j\frac{4\pi}{3}}, 0, 0,\right.$$
$$\left. c6 \times e^{-j\frac{4\pi}{3}}, 0, 0, c5 \times e^{-j\frac{2 \times 4\pi}{3}}, 0, 0, c6 \times e^{-j\frac{2 \times 4\pi}{3}}\right)$$

The sequence (X1, 0, 0, X2, 0, 0, X3, 0, 0, X4, 0, 0, X5, 0, 0, X6, 0, 0), the sequence (0, Y1, 0, 0, Y2, 0, 0, Y3, 0, 0, Y4, 0, 0, Y5, 0, 0, Y6, 0), and the sequence (0, 0, Z1, 0, 0, Z2, 0, 0, Z3, 0, 0, Z4, 0, 0, Z5, 0, 0, Z6) are respectively mapped into 18 consecutive subcarriers on a same time domain symbol.

Alternatively, the sequence (a1, 0, 0, a2, 0, 0, a1, 0, 0, a2, 0, 0, a1, 0, 0, a2, 0, 0), the sequence $$\left(0, b3, 0, 0, b4, 0, 0, b3 \times e^{-j\frac{2\pi}{3}}, 0, 0,\right.$$
$$\left. b4 \times e^{-j\frac{2\pi}{3}}, 0, 0, b3 \times e^{-j\frac{2 \times 2\pi}{3}}, 0, 0, b4 \times e^{-j\frac{2 \times 2\pi}{3}}, 0\right),$$

and the sequence $$\left(0, 0, c5, 0, 0, c6, 0, 0, c5 \times e^{-j\frac{4\pi}{3}}, 0, 0,\right.$$
$$\left. c6 \times e^{-j\frac{4\pi}{3}}, 0, 0, c5 \times e^{-j\frac{2 \times 4\pi}{3}}, 0, 0, c6 \times e^{-j\frac{2 \times 4\pi}{3}}\right)$$

are added to obtain a sequence $$\left(a1, b3, c5, a2, b4, c6, a1, b3 \times e^{-j\frac{2\pi}{3}},\right.$$
$$c5 \times e^{-j\frac{4\pi}{3}}, a2, b4 \times e^{-j\frac{2\pi}{3}}, c6 \times e^{-j\frac{4\pi}{3}}, a1, b3 \times e^{-j\frac{2 \times 2\pi}{3}},$$
$$\left. c5 \times e^{-j\frac{2 \times 4\pi}{3}}, a2, b4 \times e^{-j\frac{2 \times 2\pi}{3}}, c6 \times e^{-j\frac{2 \times 4\pi}{3}}\right).$$

After DFT is performed on the sequence $$\left(a1, b3, c5, a2, b4, c6, a1, b3 \times e^{-j\frac{2\pi}{3}},\right.$$
$$c5 \times e^{-j\frac{4\pi}{3}}, a2, b4 \times e^{-j\frac{2\pi}{3}}, c6 \times e^{-j\frac{4\pi}{3}}, a1, b3 \times e^{-j\frac{2\times 2\pi}{3}},$$
$$\left. c5 \times e^{-j\frac{2\times 4\pi}{3}}, a2, b4 \times e^{-j\frac{2\times 2\pi}{3}}, c6 \times e^{-j\frac{2\times 4\pi}{3}}\right),$$

a sequence (X1, Y1, Z1, X2, Y2, Z2, X3, Y3, Z3, X4, Y4, Z4, X5, Y5, Z5, X6, Y6, Z6) may be obtained, and directly mapping the sequence (X1, Y1, Z1, X2, Y2, Z2, X3, Y3, Z3, X4, Y4, Z4, X5, Y5, Z5, X6, Y6, Z6) into 18 consecutive subcarriers may also obtain the foregoing result.

It should be understood that, a quantity of repetition times of each of the sequence (a1, 0, 0, a2, 0, 0), the sequence (0, b3, 0, 0, b4, 0), and the sequence (0, 0, c5, 0, 0, c6) in time domain is a spacing of each subcarrier group in frequency domain, or is referred to as a comb spacing.

It should be further understood that, in this example, a value of r in a phase rotation coefficient $$e^{-j\frac{2\times ir\pi}{18}}$$

in the three sequences may be 0, 1, or 2.

EXAMPLE 3

The transmit end determines first to-be-sent information. A sequence corresponding to the first to-be-sent information is (a1, a2). A sequence (a1, 0, a2, 0) is obtained by inserting zeros into the sequence (a1, a2). A sequence (X1, X2, X3, X4) is obtained by performing DFT on the sequence (a1, 0, a2, 0). The transmit end determines a reference signal sequence (ZC1, ZC2, ZC3, ZC4). The sequence (X1, X2, X3, X4) and the sequence (ZC1, ZC2, ZC3, ZC4) are respectively mapped into two subcarrier groups. Subcarriers included in the two subcarrier groups are subcarriers on a same time domain symbol, the subcarriers included in each of the two subcarrier groups are evenly distributed subcarriers, and the spacing is 2.

For a receive end, a signal transmission method on a receive end side includes the following steps: The receive end receives a signal from subcarriers. The subcarriers are subcarriers on a same time domain symbol.

The receive end performs an FFT on the signal to obtain a first received signal corresponding to a first sequence and a second received signal corresponding to a second sequence. The first sequence is carried on subcarriers in a first subcarrier group in the subcarriers, and the second sequence is carried on subcarriers in a second subcarrier group in the subcarriers. There is no identical subcarrier in the first subcarrier group and the second subcarrier group. The subcarriers in the first subcarrier group are evenly distributed subcarriers in a subcarrier set, and two adjacent subcarriers in the first subcarrier group are spaced by L−1 subcarriers in the subcarrier set. The subcarriers in the second subcarrier group are evenly distributed subcarriers in the subcarrier set, and two adjacent subcarriers in the second subcarrier group are spaced by L−1 subcarriers in the subcarrier set. The first sequence is a Fourier transform sequence of a third sequence, and the second sequence is a Fourier transform sequence of a fourth sequence. Elements at a same location in the third sequence and the fourth sequence are not both non-zero elements. The third sequence and the fourth sequence each are a sequence in which at least one element is a non-zero element. The subcarrier set includes LM subcarriers that are evenly distributed in frequency domain. Both L and M are positive integers. The receive end performs signal processing on the first received signal and the second received signal.

Corresponding to the foregoing element quantity, the signal transmission method on the receive end side may specifically include the following operations: The receive end receives a signal from 2M subcarriers. The 2M subcarriers are subcarriers on a same time domain symbol. The receive end performs fast Fourier transform FFT on the signal to obtain a first received signal corresponding to a first sequence and a second received signal corresponding to a second sequence. The first sequence is carried on M subcarriers in a first subcarrier group in the 2M subcarriers. The second sequence is carried on M subcarriers in a second subcarrier group in the 2M subcarriers. There is no identical subcarrier in the first subcarrier group and the second subcarrier group. The subcarriers in the first subcarrier group are evenly distributed subcarriers in a subcarrier set, and two adjacent subcarriers in the first subcarrier group are spaced by L−1 subcarriers in the subcarrier set. The subcarriers in the second subcarrier group are evenly distributed subcarriers in the subcarrier set, and two adjacent subcarriers in the second subcarrier group are spaced by L−1 subcarriers in the subcarrier set. The first sequence is a Fourier transform sequence of a third sequence, and the second sequence is a Fourier transform sequence of a fourth sequence. Elements at a same location in the third sequence and the fourth sequence are not both non-zero elements. The third sequence and the fourth sequence each are a sequence in which at least one element is a non-zero element. The subcarrier set includes LM subcarriers that are evenly distributed in frequency domain. Both L and M are positive integers. The receive end performs signal processing on the first received signal and the second received signal.

Characteristics of the first sequence, the second sequence, the third sequence, and the fourth sequence are consistent with the foregoing described characteristics of corresponding sequences at the transmit end, and details are not described herein again.

For a data signal, signal processing in the embodiments of this application may specifically include performing balancing, IDFT, and the like on a sequence. For a reference signal, signal processing may specifically include performing channel estimation and the like on a sequence. For a sequence carrying information, signal processing includes obtaining a related value and the like of a sequence. Correspondingly, that the receive ends performs signal processing on the first received signal and the second received signal may include the following steps: The receive end performs inverse discrete Fourier transform IDFT on the first received signal to obtain the third sequence; and/or the receive end performs an IDFT on the second received signal to obtain the fourth sequence.

When the first received signal or the second received signal is a data signal, for example, a physical downlink shared channel (PDSCH), signal processing further includes performing a balancing operation on the data signal.

Corresponding to the transmit end, in addition to the foregoing two signals, the receive end may further receive a signal from subcarriers in a third subcarrier group. The subcarriers in the third subcarrier group and the subcarriers included in the first subcarrier group and the second subcarrier group are subcarriers on a same time domain symbol.

The subcarriers in the third subcarrier group are evenly distributed subcarriers in the subcarrier set, and two adjacent subcarriers in the third subcarrier group are spaced by L−1 subcarriers in the subcarrier set. There is no same subcarrier in the third subcarrier group, the first subcarrier group, and the second subcarrier group. The receive end performs FFT on the signal carried on the third subcarrier group, to obtain a third received signal corresponding to a fifth sequence. The fifth sequence is a Fourier transform sequence of a sixth sequence. Elements at a same location in any two of the sixth sequence, the third sequence, and the fourth sequence are not both non-zero elements. The sixth sequence is a sequence in which at least one element is a non-zero element. The receive end performs signal processing on the third received signal.

As described above, when the third received signal is a data signal, for example, a PDSCH, signal processing further includes performing a balancing operation on the data signal.

With reference to FIG. 1 to FIG. 6, the foregoing describes in detail the transmission signal method in the embodiments of this application. The following separately describes a transmit end and a receive end in the embodiments of this application.

Figure 7:
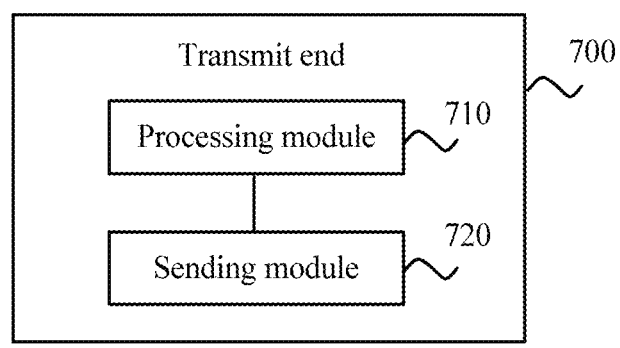
FIG. 7 is a schematic block diagram of a transmit end according to an embodiment of this application.

FIG. 7 shows a transmit end 700 according to an embodiment of this application, including:

a processing module 710, configured to: map a first sequence into subcarriers in a first subcarrier group, and map a second sequence into subcarriers in a second subcarrier group, where there is no same subcarrier in the first subcarrier group and the second subcarrier group, the subcarriers included in the first subcarrier group and the second subcarrier group are subcarriers on a same time domain symbol, the subcarriers in the first subcarrier group are evenly distributed subcarriers in a subcarrier set, two adjacent subcarriers in the first subcarrier group are spaced by L−1 subcarriers in the subcarrier set, the subcarriers in the second subcarrier group are evenly distributed subcarriers in the subcarrier set, two adjacent subcarriers in the second subcarrier group are spaced by L−1 subcarriers in the subcarrier set, the first sequence is a Fourier transform sequence of a third sequence, the second sequence is a Fourier transform sequence of a fourth sequence, elements at a same location in the third sequence and the fourth sequence are not both non-zero elements, the third sequence and the fourth sequence each are a sequence in which at least one element is a non-zero element, the subcarrier set includes LM subcarriers that are evenly distributed in frequency domain, and both L and M are positive integers, where the processing module 710 is further configured to generate a sending signal based on elements on the first subcarrier group and the second subcarrier group; and a sending module 720, configured to send the sending signal generated by the processing module 710.

According to the transmit end in this embodiment of this application, two sequences are constructed in which elements at a same time domain location are not both non-zero elements, and the two sequences are mapped into two different subcarrier groups, so that when at least two signals are transmitted on one symbol, a relatively low PAPR can be ensured, and interference between the signals is relatively low after the signals pass through channels.

Optionally, in an embodiment, the first sequence includes M elements: $a_0, a_1, K, a_{M-1}$, and the first sequence is obtained by extending a base sequence $c_0, c_1, K, c_{K-1}$ whose length is K, where M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

Optionally, in an embodiment, the second sequence includes M elements: $b_0, b_1, K, b_{M-1}$, and the second sequence is obtained by extending a base sequence $d_0, d_1, K, d_{K-1}$ whose length is K, where $b_i = d_{i \bmod K} \times e^{j\frac{2\pi i v}{M}}$, v is a value in 0, 1, K, p−1, and v is not equal to u.

Optionally, in another embodiment, the first sequence includes M elements: $a_0, a_1, K, a_{M-1}$, and the first sequence is obtained by extending a base sequence $c_0, c_1, K, c_{K-1}$ whose length is K, where M=p×K, $$a_i = c_{i \bmod K} \times e^{j\frac{2\pi \lfloor i/K \rfloor u}{p}},$$

u is a value in 0, 1, . . . , p−1, i is a variable, and a value of i is 0, 1, K, M−1.

The second sequence includes M elements: $b_0, b_1, K, b_{M-1}$, and the second sequence is obtained by extending a base sequence $d_0, d_1, K, d_{K-1}$ whose length is K, where $$b_i = d_{i \bmod K} \times e^{j\frac{2\pi \lfloor i/K \rfloor v}{p}},$$

v is a value in 0, 1, K, p−1, and v is not equal to u.

Optionally, in an embodiment, the base sequence is a ZC sequence, a cyclic extension sequence of a ZC sequence, a truncated sequence of a ZC sequence, or a reference signal sequence that meets a standard of an LTE system of the 3GPP.

Optionally, in an embodiment, before the processing module 710 maps the first sequence into the subcarriers in the first subcarrier group, the processing module 710 is further configured to perform first transform on the third sequence to obtain the first sequence, where the first transform is a DFT; and/or before the processing module 710 maps the second sequence into the subcarriers in the second subcarrier group, the processing module 710 is further configured to perform second transform on the fourth sequence to obtain the second sequence, where the second transform is a DFT.

Optionally, in an embodiment, the processing module 710 is configured to: determine the fourth sequence that includes M elements, where the M elements in the fourth sequence are $g_0, g_1, K, g_{M-1}$; and perform M×M DFT on the fourth sequence to obtain the second sequence, and map the second sequence into the subcarriers in the second subcarrier group.

Optionally, in an embodiment, the processing module 710 is configured to: determine the third sequence that includes M elements, where the M elements in the third sequence are $f_0, f_1, K, f_{M-1}$; extending the M elements $f_0, f_1, K, f_{M-1}$ in the third sequence to obtain a sequence $x_0, x_1, K, x_{LM-1}$ whose length is LM, where $$x_i = f_{i \bmod M} \times e^{-j\frac{2\pi i s}{LM}},$$

s is a value in 0, 1, K, L−1, i is a variable, and a value of i is 0, 1, K, LM−1; and perform LM×LM DFT on the third sequence to map the third sequence into M subcarriers in the first subcarrier group in the LM subcarriers.

Optionally, another implementation of mapping the first sequence includes the following steps: The transmit end determines the third sequence that includes M elements, where the M elements in the third sequence are $f_0$, $f_1$, K, $f_{M-1}$; extends the M elements $f_0$, $f_1$, K, $f_{M-1}$ in the third sequence to obtain a sequence $x_0$, $x_1$, K, $x_{LM-1}$ whose length is LM, where $$x_i = f_{imodM} \times e^{-j\frac{2\pi \lfloor i/M \rfloor s}{LM}},$$

s is a value in 0, 1, K, L−1, i is a variable, and a value of i is 0, 1, K, LM−1; and performs LM×LM DFT on the third sequence to map the third sequence into M subcarriers in the first subcarrier group in the LM subcarriers.

Optionally, in an embodiment, the processing module 710 is specifically configured to: determine the fourth sequence that includes M elements, where the M elements in the fourth sequence are $g_0$, $g_1$, K, $g_{M-1}$; extend the M elements $g_0$, $g_1$, K, $g_{M-1}$ in the fourth sequence to obtain a sequence $h_0$, $h_1$, K, $h_{LM-1}$ whose length is LM, where $$h_i = g_{imodM} \times e^{-j\frac{2\pi i t}{LM}},$$

t is a value in 0, 1, . . . , L−1, and t is not equal to s; and perform LM×LM DFT on the fourth sequence to map the fourth sequence into M subcarriers in the first subcarrier group in the LM subcarriers.

Optionally, another embodiment of mapping the second sequence includes the following operations: The transmit end determines the fourth sequence that includes M elements, where the M elements in the fourth sequence are $g_0$, $g_1$, K, $g_{M-1}$; extends the M elements $g_0$, $g_1$, K, $g_{M-1}$ in the fourth sequence to obtain a sequence $h_0$, $h_1$, K, $h_{LM-1}$ whose length is LM, where $$h_i = g_{imodM} \times e^{-j\frac{2\pi \lfloor i/M \rfloor t}{L}},$$

t is a value in 0, 1, . . . , L−1, and t is not equal to s; and performs LM×LM DFT on the fourth sequence to map the fourth sequence into M subcarriers in the first subcarrier group in the LM subcarriers.

Optionally, in an embodiment, the third sequence is a sequence obtained by performing an IDFT on the first sequence, and the fourth sequence is a sequence obtained by performing an IDFT transform on the second sequence.

Optionally, in an embodiment, the processing module 710 is further configured to map a fifth sequence into subcarriers in a third subcarrier group, where the fifth sequence is a Fourier transform sequence of a sixth sequence, the subcarriers in the third subcarrier group and the subcarriers included in the first subcarrier group and the second subcarrier group are subcarriers on a same time domain symbol, elements at a same location in any two of the sixth sequence, the third sequence, and the fourth sequence are not both non-zero elements, the subcarriers in the third subcarrier group are evenly distributed subcarriers in the subcarrier set, two adjacent subcarriers in the third subcarrier group are spaced by L−1 subcarriers in the subcarrier set, there is no identical subcarrier in the third subcarrier group, the first subcarrier group, and the second subcarrier group, and the sixth sequence is a sequence in which at least one element is a non-zero element.

Optionally, in an embodiment, non-zero elements in the third sequence are evenly distributed, and/or non-zero elements in the fourth sequence are evenly distributed.

Figure 8:
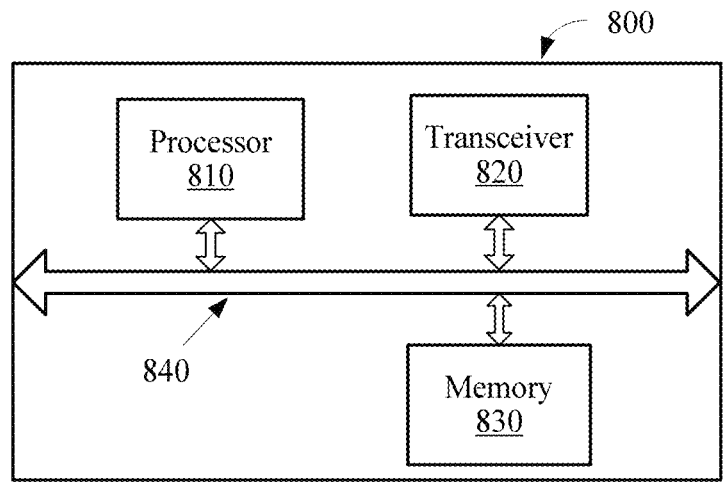
FIG. 8 is a schematic block diagram of a transmit end according to another embodiment of this application.

It should be noted that in this embodiment of this application, the processing module 710 may be implemented by a processor, and the sending module 720 may be implemented by a transceiver. As shown in FIG. 8, a transmit end 800 may include a processor 810, a transceiver 820, and a memory 830. The memory 830 may be configured to store code or the like executed by the processor 810.

The components of the transmit end 800 are coupled together by using a bus system 840. In addition to a data bus, the bus system 840 further includes a power bus, a control bus, and a status signal bus.

The transmit end 700 shown in FIG. 7 or the transmit end 800 shown in FIG. 8 can implement the processes implemented in the embodiments in FIG. 1 to FIG. 6. To avoid repetition, details are not described herein again.

It should be noted that the foregoing method embodiments of this application may be applied to the processor, or be implemented by the processor. The processor may be an integrated circuit chip, and has a signal processing capability. In an implementation process, steps in the foregoing method embodiments can be implemented by using a hardware integrated logical circuit in the processor or instructions in a form of software. The processor may be a general purpose processor, a digital signal processor (DSP), an application-specific integrated circuit (ASIC), a field programmable gate array (FPGA) or another programmable logical device, a discrete gate or a transistor logic device, or a discrete hardware component. The processor may implement or perform the methods, the steps, and logical block diagrams that are disclosed in the embodiments of this application. The general purpose processor may be a microprocessor, or may be any conventional processor or the like. Steps in the methods disclosed with reference to the embodiments of this application may be directly performed by a hardware decoding processor, or may be performed by using a combination of hardware in a decoding processor and a software module. The software module may be located in a mature storage medium in the field, such as a random access memory, a flash memory, a read-only memory, a programmable read-only memory, an electrically erasable programmable memory, or a register. The storage medium is located in the memory. The processor reads information from the memory, and completes the steps in the foregoing methods in combination with hardware of the processor.

It may be understood that, the memory in this embodiment of this application may be a volatile memory or a nonvolatile memory, or may include a volatile memory and a nonvolatile memory. The nonvolatile memory may be a read-only memory ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that, the memory in the system and method described in this specification is to include but is not limited to these and a memory of any another appropriate type.

Figure 9:
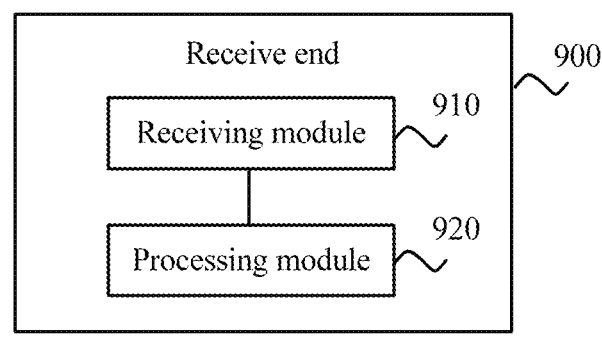
FIG. 9 is a schematic block diagram of a receive end according to an embodiment of this application.

FIG. 9 shows a receive end 900 according to an embodiment of this application, including:

a receiving module 910, configured to receive a signal from subcarriers, where the subcarriers are subcarriers on a same time domain symbol; and a processing module 920, configured to perform an FFT on the signal received by the receiving module 910, to obtain a first received signal corresponding to a first sequence and a second received signal corresponding to a second sequence, where the first sequence is carried on subcarriers in a first subcarrier group in the subcarriers, the second sequence is carried on subcarriers in a second subcarrier group in the subcarriers, there is no same subcarrier in the first subcarrier group and the second subcarrier group, the subcarriers in the first subcarrier group are evenly distributed subcarriers in a subcarrier set, two adjacent subcarriers in the first subcarrier group are spaced by L−1 subcarriers in the subcarrier set, the subcarriers in the second subcarrier group are evenly distributed subcarriers in the subcarrier set, two adjacent subcarriers in the second subcarrier group are spaced by L−1 subcarriers in the subcarrier set, the first sequence is a Fourier transform sequence of a third sequence, the second sequence is a Fourier transform sequence of a fourth sequence, elements at a same location in the third sequence and the fourth sequence are not both non-zero elements, the third sequence and the fourth sequence each are a sequence in which at least one element is a non-zero element, the subcarrier set includes LM subcarriers that are evenly distributed in frequency domain, and both L and M are positive integers, where the processing module 920 is further configured to perform signal processing on the first received signal and the second received signal.

According to the receive end in this application, elements at a same time domain location in two sequences corresponding to two signals received on one symbol are not both non-zero elements, and the two sequences are mapped into two different subcarrier groups, so that when two signals are received on one symbol, a relatively low PAPR can be ensured, and interference between the signals is relatively low.

Optionally, in an embodiment, the first sequence includes M elements: $a_0, a_1, K, a_{M-1}$, and the first sequence is obtained by extending a base sequence $c_0, c_1, K, c_{K-1}$ whose length is K, where M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

Optionally, in an embodiment, the second sequence includes M elements: $b_0, b_1, K, b_{M-1}$, and the second sequence is obtained by extending a base sequence $d_0, d_1, K, d_{K-1}$ whose length is K, where $$b_i = d_{i \bmod K} \times e^{j\frac{2\pi i v}{M}},$$

v is a value in 0, 1, K, p−1, and v is not equal to u.

Optionally, in another implementation, the first sequence includes M elements: $a_0, a_1, K, a_{M-1}$, and the first sequence is obtained by extending a base sequence $c_0, c_1, K, c_{K-1}$ whose length is K, where M=p×K, $$a_i = c_{i \bmod K} \times e^{j\frac{2\pi \lfloor i/K \rfloor u}{p}},$$

u is a value in 0, 1, . . . , p−1, i is a variable, and a value of i is 0, 1, K, M−1.

The second sequence includes M elements: $b_0, b_1, K, b_{M-1}$, and the second sequence is obtained by extending a base sequence $d_0, d_1, K, d_{K-1}$ whose length is K, where $$b_i = d_{i \bmod K} \times e^{j\frac{2\pi \lfloor i/K \rfloor v}{p}},$$

v is a value in 0, 1, K, p−1, and v is not equal to u.

Optionally, in an embodiment, the base sequence is a ZC sequence, a cyclic extension sequence of a ZC sequence, a truncated sequence of a ZC sequence, or a reference signal sequence that meets a standard of an LTE system of the 3GPP.

Optionally, in an embodiment, the third sequence is a sequence obtained by performing inverse discrete Fourier transform IDFT on the first sequence, and the fourth sequence is a sequence obtained by performing IDFT transform on the second sequence.

Optionally, in an embodiment, the receiving module 910 is further configured to receive a signal from subcarriers in a third subcarrier group, where the subcarriers in the third subcarrier group and the subcarriers included in the first subcarrier group and the second subcarrier group are subcarriers on a same time domain symbol, the subcarriers in the third subcarrier group are evenly distributed subcarriers in the subcarrier set, two adjacent subcarriers in the third subcarrier group are spaced by L−1 subcarriers in the subcarrier set, and there is no same subcarrier in the third subcarrier group, the first subcarrier group, and the second subcarrier group.

The processing module 920 is further configured to perform FFT on the signal carried on the third subcarrier group, to obtain a third received signal corresponding to a fifth sequence, where the fifth sequence is a Fourier transform sequence of a sixth sequence, elements at a same location in any two of the sixth sequence, the third sequence, and the fourth sequence are not both non-zero elements, and the sixth sequence is a sequence in which at least one element is a non-zero element.

The processing module 920 is further configured to perform signal processing on the third received signal.

Optionally, in an embodiment, the processing module 920 is specifically configured to:

perform an IDFT on the first received signal to obtain the third sequence; and/or perform an IDFT on the second received signal to obtain the fourth sequence.

Optionally, in an embodiment, non-zero elements in the third sequence are evenly distributed; and/or non-zero elements in the fourth sequence are evenly distributed.

Figure 10:
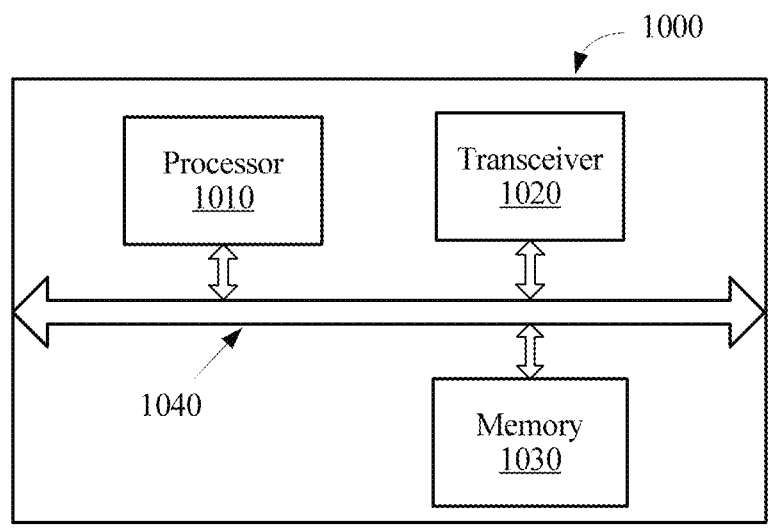
FIG. 10 is a schematic block diagram of a receive end according to another embodiment of this application.

It should be noted that in this embodiment of the present invention, the receiving module 910 may be implemented by a transceiver, and the processing module 920 may be implemented by a processor. As shown in FIG. 10, a receive end 1000 may include a processor 1010, a transceiver 1020, and a memory 1030. The memory 1030 may be configured to store code or the like executed by the processor 1010.

The components of the receive end 1000 are coupled together by using a bus system 1040. In addition to a data bus, the bus system 1040 further includes a power bus, a control bus, and a status signal bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions in this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps in the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
mapping, by a transmit end, a first sequence into a plurality of subcarriers in a first subcarrier group, and mapping, by the transmit end, a second sequence into a plurality of subcarriers in a second subcarrier group, wherein there is no identical subcarrier in the first subcarrier group and the second subcarrier group, the subcarriers comprised in the first subcarrier group and the second subcarrier group are subcarriers on a same time domain symbol, wherein the subcarriers in the first subcarrier group are evenly distributed subcarriers in a subcarrier set, two adjacent subcarriers in the first subcarrier group are spaced by L−1 subcarriers in the subcarrier set, wherein the subcarriers in the second subcarrier group are evenly distributed subcarriers in the subcarrier set, two adjacent subcarriers in the second subcarrier group are spaced by L−1 subcarriers in the subcarrier set, wherein the first sequence is a Fourier transform sequence of a third sequence, the second sequence is a Fourier transform sequence of a fourth sequence, wherein at least one element at a same location in the third sequence and the fourth sequence is zero, wherein the third sequence and the fourth sequence each are a sequence in which at least one element is a non-zero element, the subcarrier set comprises LM subcarriers that are evenly distributed in a frequency domain, and both L and M are positive integers;
generating, by the transmit end, a sending signal based on elements on the first subcarrier group and the second subcarrier group; and
sending, by the transmit end, the sending signal.

2. The method according to claim 1, wherein the first sequence comprises M elements: $a_0, a_1, K, a_{M-1}$, and the first sequence is obtained by extending a base sequence $c_0, c_1, K, c_{K-1}$ whose length is K, wherein M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

3. The method according to claim 2, wherein the second sequence comprises M elements: $b_0, b_1, K, b_{M-1}$, and the second sequence is obtained by extending a base sequence $d_0, d_1, K, d_{K-1}$ whose length is K, wherein $$b_i = d_{i \bmod K} \times e^{j\frac{2\pi i v}{M}},$$

v is a value in 0, 1, K, p−1, and v is not equal to u.

4. The method according to claim 2, wherein the base sequence is a ZC sequence, a cyclic extension sequence of a ZC sequence, a truncated sequence of a ZC sequence, or a reference signal sequence that meets a standard of a Long Term Evolution (LTE) system of a 3rd Generation Partnership Project (3GPP).

5. The method according to claim 1, wherein before the mapping a first sequence into subcarriers in a first subcarrier group, the method further comprises: performing, by the transmit end, a first transform on the third sequence to obtain the first sequence, wherein the first transform is a discrete Fourier transform (DFT); and/or before the mapping a second sequence into subcarriers in a second subcarrier group, the method further comprises: performing, by the transmit end, a second transform on the fourth sequence to obtain the second sequence, wherein the second transform is a DFT.

6. A signal transmission method, comprising:

receiving, by a receive end, a signal from a plurality of subcarriers, wherein the subcarriers are subcarriers on a same time domain symbol;

performing, by the receive end, a fast Fourier transform (FFT) on the signal to obtain a first received signal corresponding to a first sequence and a second received signal corresponding to a second sequence, wherein the first sequence is carried on subcarriers in a first subcarrier group in the subcarriers, the second sequence is carried on subcarriers in a second subcarrier group in the subcarriers, there is no identical subcarrier in the first subcarrier group and the second subcarrier group, wherein the subcarriers in the first subcarrier group are evenly distributed subcarriers in a subcarrier set, two adjacent subcarriers in the first subcarrier group are spaced by L−1 subcarriers in the subcarrier set, wherein the subcarriers in the second subcarrier group are evenly distributed subcarriers in the subcarrier set, two adjacent subcarriers in the second subcarrier group are spaced by L−1 subcarriers in the subcarrier set, wherein the first sequence is a Fourier transform sequence of a third sequence, the second sequence is a Fourier transform sequence of a fourth sequence, wherein at least one element at a same location in the third sequence and the fourth sequence is zero, wherein the third sequence and the fourth sequence each are a sequence in which at least one element is a non-zero element, the subcarrier set comprises LM subcarriers that are evenly distributed in frequency domain, and both L and M are positive integers; and performing, by the receive end, signal processing on the first received signal and the second received signal.

7. The method according to claim 6, wherein the first sequence comprises M elements: $a_0, a_1, K, a_{M-1}$, and the first sequence is obtained by extending a base sequence $c_0, c_1, K, c_{K-1}$ whose length is K, wherein M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

8. The method according to claim 7, wherein the second sequence comprises M elements: $b_0, b_1, K, b_{M-1}$, and the second sequence is obtained by extending a base sequence $d_0, d_1, K, d_{K-1}$ whose length is K, wherein $$b_i = d_{i \bmod K} \times e^{j\frac{2\pi i v}{M}},$$

v is a value in 0, 1, K, p−1, and v is not equal to u.

9. The method according to claim 7, wherein the base sequence is a ZC sequence, a cyclic extension sequence of a ZC sequence, a truncated sequence of a ZC sequence, or a reference signal sequence that meets a standard of a Long Term Evolution (LTE) system of a 3rd Generation Partnership Project (3GPP).

10. The method according to claim 6, wherein the third sequence is a sequence obtained by performing inverse discrete Fourier transform (IDFT) on the first sequence, and the fourth sequence is a sequence obtained by performing an IDFT transform on the second sequence.

11. A transmit end, comprising:

a processor, configured to: map a first sequence into a plurality of subcarriers in a first subcarrier group, and map a second sequence into a plurality of subcarriers in a second subcarrier group, wherein there is no identical subcarrier in the first subcarrier group and the second subcarrier group, the subcarriers comprised in the first subcarrier group and the second subcarrier group are subcarriers on a same time domain symbol, wherein the subcarriers in the first subcarrier group are evenly distributed subcarriers in a subcarrier set, two adjacent subcarriers in the first subcarrier group are spaced by L−1 subcarriers in the subcarrier set, the subcarriers in the second subcarrier group are evenly distributed subcarriers in the subcarrier set, two adjacent subcarriers in the second subcarrier group are spaced by L−1 subcarriers in the subcarrier set, wherein the first sequence is a Fourier transform sequence of a third sequence, the second sequence is a Fourier transform sequence of a fourth sequence, wherein at least one element at a same location in the third sequence and the fourth sequence is zero, the third sequence and the fourth sequence each are a sequence in which at least one element is a non-zero element, wherein the subcarrier set comprises LM subcarriers that are evenly distributed in frequency domain, and both L and M are positive integers, wherein the processor is further configured to generate a sending signal based on elements on the first subcarrier group and the second subcarrier group; and a transmitter, configured to send the sending signal generated by the processor.

12. The transmit end according to claim 11, wherein the first sequence comprises M elements: $a_0, a_1, K, a_{M-1}$, and the first sequence is obtained by extending a base sequence $c_0, c_1, K, c_{K-1}$ whose length is K, wherein M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

13. The method according to claim 12, wherein the second sequence comprises M elements: $b_0, b_1, K, b_{M-1}$, and the second sequence is obtained by extending a base sequence $d_0, d_1, K, d_{K-1}$ whose length is K, wherein $$b_i = d_{i \bmod K} \times e^{j\frac{2\pi i v}{M}},$$

v is a value in 0, 1, K, p−1, and v is not equal to u.

14. The transmit end according to claim 12, wherein the base sequence is a ZC sequence, a cyclic extension sequence of a ZC sequence, a truncated sequence of a ZC sequence, or a reference signal sequence that meets a standard of a Long Term Evolution (LTE) system of a 3rd Generation Partnership Project (3GPP).

15. The transmit end according to claim 11, before the processor maps the first sequence into the subcarriers in the first subcarrier group, the processor is further configured to perform first transform on the third sequence to obtain the first sequence, wherein the first transform is a discrete Fourier transform (DFT); and/or before the processor maps the second sequence into the subcarriers in the second subcarrier group, the processor is further configured to perform second transform on the fourth sequence to obtain the second sequence, wherein the second transform is a DFT.

16. A receive end, comprising:
a receiver, configured to receive a signal from a plurality of subcarriers, wherein the subcarriers are subcarriers on a same time domain symbol; and
a processor, configured to perform a fast Fourier transform (FFT) on the signal received by the receiver, to obtain a first received signal corresponding to a first sequence and a second received signal corresponding to a second sequence, wherein the first sequence is carried on subcarriers in a first subcarrier group in the subcarriers, the second sequence is carried on subcarriers in a second subcarrier group in the subcarriers, there is no identical subcarrier in the first subcarrier group and the second subcarrier group, wherein the subcarriers in the first subcarrier group are evenly distributed subcarriers in a subcarrier set, two adjacent subcarriers in the first subcarrier group are spaced by L−1 subcarriers in the subcarrier set, wherein the subcarriers in the second subcarrier group are evenly distributed subcarriers in the subcarrier set, two adjacent subcarriers in the second subcarrier group are spaced by L−1 subcarriers in the subcarrier set, wherein the first sequence is a Fourier transform sequence of a third sequence, the second sequence is a Fourier transform sequence of a fourth sequence, wherein at least one element at a same location in the third sequence and the fourth sequence is zero, wherein the third sequence and the fourth sequence each are a sequence in which at least one element is a non-zero element, the subcarrier set comprises LM subcarriers that are evenly distributed in frequency domain, and both L and M are positive integers, wherein
the processor is further configured to perform signal processing on the first received signal and the second received signal.

17. The method according to claim 16, wherein the first sequence comprises M elements: $a_0, a_1, K, a_{M-1}$, and the first sequence is obtained by extending a base sequence $c_0, c_1, K, c_{K-1}$ whose length is K, wherein M=p×K, $$a_i = c_{i \bmod K} \times e^{j\frac{2\pi i u}{M}},$$

u is a value in 0, 1, K, p−1, i is a variable, a value of i is 0, 1, K, M−1, and both p and K are positive integers.

18. The method according to claim 17, wherein the second sequence comprises M elements: $b_0, b_1, K, b_{M-1}$, and the second sequence is obtained by extending a base sequence $d_0, d_1, K, d_{K-1}$ whose length is K, wherein $$b_i = d_{i \bmod K} \times e^{j\frac{2\pi i v}{M}},$$

v is a value in 0, 1, K, p−1, and v is not equal to u.

19. The receive end according to claim 17, wherein the base sequence is a ZC sequence, a cyclic extension sequence of a ZC sequence, a truncated sequence of a ZC sequence, or a reference signal sequence that meets a standard of a Long Term Evolution (LTE) system of a 3rd Generation Partnership Project (3GPP).

20. The receive end according to claim 16, wherein the receiver is further configured to receive a signal from subcarriers in a third subcarrier group, wherein the subcarriers in the third subcarrier group and the subcarriers comprised in the first subcarrier group and the second subcarrier group are subcarriers on a same time domain symbol, wherein the subcarriers in the third subcarrier group are evenly distributed subcarriers in the subcarrier set, two adjacent subcarriers in the third subcarrier group are spaced by L−1 subcarriers in the subcarrier set, and there is no identical subcarrier in the third subcarrier group, the first subcarrier group, and the second subcarrier group;

the processor is further configured to perform an FFT on the signal carried on the third subcarrier group, to obtain a third received signal corresponding to a fifth sequence, wherein the fifth sequence is a Fourier transform sequence of a sixth sequence, elements at a same location in any two of the sixth sequence, the third sequence, and the fourth sequence are not both non-zero elements, and the sixth sequence is a sequence in which at least one element is a non-zero element; and
the processor is further configured to perform signal processing on the third received signal.

* * * * *

UNITED STATES PATENT AND TRADEMARK OFFICE
CERTIFICATE OF CORRECTION

PATENT NO. : 10,812,305 B2
APPLICATION NO. : 16/186446
DATED : October 20, 2020
INVENTOR(S) : Bingyu Qu, Jianqin Liu and Yongxing Zhou It is certified that error appears in the above-identified patent and that said Letters Patent is hereby corrected as shown below:

In the Specification

In Column 2, Line 46, delete "$f_0, f_1, K, f_{M-1}$" and insert --$f_0, f_1, \ldots f_{M-1}$--.

In Column 2, Line 47-48, delete "$g_0, g_1, K, g_{M-1}$" and insert --$g_0, g_1, \ldots g_{M-1}$--.

In Column 2, Line 51-52, delete "$f_0, g_0, f_1, g_1, K, f_{M-1}, g_{M-1}$" and insert --$f_0, g_0, f_1, g_1, \ldots f_{M-1}, g_{M-1}$--.

In Column 4, Line 40, delete "$f_0, f_1, K, f_{M-1}$" and insert --$f_0, f_1, \ldots f_{M-1}$--.

In Column 4, Line 41, delete "$f_0, f_1, K, f_{M-1}$" and insert --$f_0, f_1, \ldots f_{M-1}$--.

In Column 4, Line 42, delete "$x_0, x_1, K, x_{LM-1}$" and insert --$x_0, x_1, \ldots, x_{LM-1}$--.

In Column 4, Line 48, delete "$0, 1, K, L-1$" and insert --$0, 1, \ldots, L-1$--.

In Column 4, Line 49, delete "$0, 1, K, LM-1$" and insert --$0, 1, \ldots, LM-1$--.

In Column 4, Line 55, delete "$f_0, f_1, K, f_{M-1}$" and insert --$f_0, f_1, \ldots f_{M-1}$--.

In Column 4, Line 55-56, delete "$f_0, f_1, K, f_{M-1}$" and insert --$f_0, f_1, \ldots f_{M-1}$--.

In Column 4, Line 56-57, delete "$x_0, x_1, K, x_{LM-1}$" and insert --$x_0, x_1, \ldots, x_{LM-1}$--.

In Column 4, Line 64, delete "$0, 1, K, LM-1$" and insert --$0, 1, \ldots, LM-1$--.

In Column 4, Line 65, delete "$0, 1, K, LM-1$" and insert --$0, 1, \ldots, LM-1$--.

In Column 5, Line 4, delete "$g_0, g_1, K, g_{M-1}$" and insert --$g_0, g_1, \ldots g_{M-1}$--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,812,305 B2

In Column 5, Line 5, delete "$g_0, g_1, K, g_{M-1}$" and insert --$g_0, g_1, \ldots g_{M-1}$--.

In Column 5, Line 6, delete "$h_0, h_1, K, h_{LM-1}$" and insert --$h_0, h_1, \ldots, h_{LM-1}$--.

In Column 5, Line 13, delete "$0, 1, K, L-1$" and insert --$0, 1, \ldots, L-1$--.

In Column 5, Line 20, delete "$g_0, g_1, K, g_{M-1}$" and insert --$g_0, g_1, \ldots g_{M-1}$--.

In Column 5, Line 20-21, delete "$g_0, g_1, K, g_{M-1}$" and insert --$g_0, g_1, \ldots g_{M-1}$--.

In Column 5, Line 21-22, delete "$h_0, h_1, K, h_{LM-1}$" and insert --$h_0, h_1, \ldots, h_{LM-1}$--.

In Column 5, Line 29, delete "$0, 1, K, L-1$" and insert --$0, 1, \ldots, L-1$--.

In Column 5, Line 36, delete "$g_0, g_1, K, g_{M-1}$" and insert --$g_0, g_1, \ldots g_{M-1}$--.

In Column 7, Line 4-5, delete "$a_0, a_1, K, a_{M-1}$" and insert --$a_0, a_1, \ldots, a_{M-1}$--.

In Column 7, Line 6, delete "$c_0, c_1, K, c_{K-1}$" and insert --$c_0, c_1, \ldots, c_{K-1}$--.

In Column 7, Line 13, delete "$0, 1, K, p-1$" and insert --$0, 1, \ldots, p-1$--.

In Column 7, Line 13-14, delete "$0, 1, K, M-1$" and insert --$0, 1, \ldots, M-1$--.

In Column 7, Line 16-17, delete "$b_0, b_1, K, b_{M-1}$" and insert --$b_0, b_1, \ldots, b_{M-1}$--.

In Column 7, Line 18, delete "$d_0, d_1, K, d_{K-1}$" and insert --$d_0, d_1, \ldots, d_{K-1}$--.

In Column 7, Line 26, delete "$0, 1, K, p-1$" and insert --$0, 1, \ldots, p-1$--.

In Column 7, Line 42, delete "$a_0, a_1, K, a_{M-1}$" and insert --$a_0, a_1, \ldots, a_{M-1}$--.

In Column 7, Line 43, delete "$c_0, c_1, K, c_{K-1}$" and insert --$c_0, c_1, \ldots, c_{K-1}$--.

In Column 7, Line 51, delete "$0, 1, K, M-1$" and insert --$0, 1, \ldots, M-1$--.

In Column 7, Line 54, delete "$b_0, b_1, K, b_{M-1}$" and insert --$b_0, b_1, \ldots, b_{M-1}$--.

In Column 7, Line 56, delete "$d_0, d_1, K, d_{K-1}$" and insert --$d_0, d_1, \ldots, d_{K-1}$--.

In Column 7, Line 62, delete "$0, 1, K, p-1$" and insert --$0, 1, \ldots, p-1$--.

In Column 12, Line 28, delete "$f_0, f_1, K, f_{M-1}$" and insert --$f_0, f_1, \ldots f_{M-1}$--.

In Column 12, Line 29-30, delete "$g_0, g_1, K, g_{M-1}$" and insert --$g_0, g_1, \ldots g_{M-1}$--.

CERTIFICATE OF CORRECTION (continued)
U.S. Pat. No. 10,812,305 B2

In Column 12, Line 33-34, delete "$f_0, g_0, f_1, g_1, K, f_{M-1}, g_{M-1}$" and insert --$f_0, g_0, f_1, g_1, \ldots f_{M-1}, g_{M-1}$--.

In Column 13, Line 35-36, delete "$f_0, f_1, K, f_{M-1}$" and insert --$f_0, f_1, \ldots f_{M-1}$--.

In Column 13, Line 36-37, delete "$g_0, g_1, K, g_{M-1}$" and insert --$g_0, g_1, \ldots g_{M-1}$--.

In Column 13, Line 53, delete "$a_0, a_1, K, a_{M-1}$" and insert --$a_0, a_1, \ldots, a_{M-1}$--.

In Column 13, Line 55, delete "$b_0, b_1, K, b_{M-1}$" and insert --$b_0, b_1, \ldots, b_{M-1}$--.

In Column 15, Line 23, delete "$f_0, f_2, f_4, K$" and insert --$f_0, f_2, f_4, \ldots$--.

In Column 15, Line 24, delete "$f_1, f_3, f_5, K$" and insert --$f_1, f_3, f_5, \ldots$--.

In Column 15, Line 24-25, delete "$f_0, f_3, f_6, K$" and insert --$f_0, f_3, f_6, \ldots$--.

In Column 17, Line 5, delete "$a_0, a_1, K, a_{M-1}$" and insert --$a_0, a_1, \ldots, a_{M-1}$--.

In Column 17, Line 7, delete "$c_0, c_1, K, c_{K-1}$" and insert --$c_0, c_1, \ldots, c_{K-1}$--.

In Column 17, Line 14, delete "$0, 1, K, p-1$" and insert --$0, 1, \ldots, p-1$--.

In Column 17, Line 14-15, delete "$0, 1, K, M-1$" and insert --$0, 1, \ldots, M-1$--.

In Column 17, Line 16-17, delete "$b_0, b_1, K, b_{M-1}$" and insert --$b_0, b_1, \ldots, b_{M-1}$--.

In Column 17, Line 18, delete "$d_0, d_1, K, d_{K-1}$" and insert --$d_0, d_1, \ldots, d_{K-1}$--.

In Column 17, Line 24, delete "$0, 1, K, p-1$" and insert --$0, 1, \ldots, p-1$--.

In Column 17, Line 34, delete "$a_0, a_1, K, a_{M-1}$" and insert --$a_0, a_1, \ldots, a_{M-1}$--.

In Column 17, Line 35, delete "$c_0, c_1, K, c_{K-1}$" and insert --$c_0, c_1, \ldots, c_{K-1}$--.

In Column 17, Line 42, delete "$0, 1, K, p-1$" and insert --$0, 1, \ldots, p-1$--.

In Column 17, Line 43, delete "$0, 1, K, M-1$" and insert --$0, 1, \ldots, M-1$--.

In Column 17, Line 44-45, delete "$b_0, b_1, K, b_{M-1}$" and insert --$b_0, b_1, \ldots, b_{M-1}$--.

In Column 17, Line 46, delete "$d_0, d_1, K, d_{K-1}$" and insert --$d_0, d_1, \ldots, d_{K-1}$--.

In Column 17, Line 53, delete "$0, 1, K, p-1$" and insert --$0, 1, \ldots, p-1$--.

In Column 19, Line 57-58, delete "$f_0, f_1, K, f_{M-1}$" and insert --$f_0, f_1, \ldots f_{M-1}$--.

CERTIFICATE OF CORRECTION (continued)
U.S. Pat. No. 10,812,305 B2

In Column 19, Line 58, delete "$f_0, f_1, K, f_{M-1}$" and insert --$f_0, f_1, \ldots f_{M-1}$--.

In Column 19, Line 59, delete "$x_0, x_1, K, x_{LM-1}$" and insert --$x_0, x_1, \ldots, x_{LM-1}$--.

In Column 19, Line 66, delete "$0, 1, K, L-1$" and insert --$0, 1, \ldots, L-1$--.

In Column 19, Line 67, delete "$0, 1, K, LM-1$" and insert --$0, 1, \ldots, LM-1$--.

In Column 20, Line 17-18, delete "$f_0, f_1, K, f_{M-1}$" and insert --$f_0, f_1, \ldots f_{M-1}$--.

In Column 20, Line 18, delete "$f_0, f_1, K, f_{M-1}$" and insert --$f_0, f_1, \ldots f_{M-1}$--.

In Column 20, Line 19, delete "$x_0, x_1, K, x_{LM-1}$" and insert --$x_0, x_1, \ldots, x_{LM-1}$--.

In Column 20, Line 26, delete "$0, 1, K, L-1$" and insert --$0, 1, \ldots, L-1$--.

In Column 20, Line 27, delete "$0, 1, K, LM-1$" and insert --$0, 1, \ldots, LM-1$--.

In Column 20, Line 32-33, delete "$g_0, g_1, K, g_{M-1}$" and insert --$g_0, g_1, \ldots g_{M-1}$--.

In Column 20, Line 33, delete "$g_0, g_1, K, g_{M-1}$" and insert --$g_0, g_1, \ldots g_{M-1}$--.

In Column 20, Line 34, delete "$h_0, h_1, K, h_{LM-1}$" and insert --$h_0, h_1, \ldots, h_{LM-1}$--.

In Column 20, Line 49, delete "$g_0, g_1, K, g_{M-1}$" and insert --$g_0, g_1, \ldots g_{M-1}$--.

In Column 20, Line 49, delete "$g_0, g_1, K, g_{M-1}$" and insert --$g_0, g_1, \ldots g_{M-1}$--.

In Column 20, Line 50, delete "$h_0, h_1, K, h_{LM-1}$" and insert --$h_0, h_1, \ldots, h_{LM-1}$--.

In Column 27, Line 65, delete "$a_0, a_1, K, a_{M-1}$" and insert --$a_0, a_1, \ldots, a_{M-1}$--.

In Column 27, Line 66, delete "$c_0, c_1, K, c_{K-1}$" and insert --$c_0, c_1, \ldots, c_{K-1}$--.

In Column 28, Line 5, delete "$0, 1, K, p-1$" and insert --$0, 1, \ldots, p-1$--.

In Column 28, Line 5-6, delete "$0, 1, K, M-1$" and insert --$0, 1, \ldots, M-1$--.

In Column 28, Line 8, delete "$b_0, b_1, K, b_{M-1}$" and insert --$b_0, b_1, \ldots, b_{M-1}$--.

In Column 28, Line 9-10, delete "$d_0, d_1, K, d_{K-1}$" and insert --$d_0, d_1, \ldots, d_{K-1}$--.

In Column 28, Line 23, delete "$0, 1, K, M-1$" and insert --$0, 1, \ldots, M-1$--.

In Column 28, Line 24-25, delete "$b_0, b_1, K, b_{M-1}$" and insert --$b_0, b_1, \ldots, b_{M-1}$--.

CERTIFICATE OF CORRECTION (continued)
U.S. Pat. No. 10,812,305 B2

In Column 28, Line 26, delete "$d_0, d_1, K, d_{K-1}$" and insert --$d_0, d_1, \ldots, d_{K-1}$--.

In Column 28, Line 32, delete "$0, 1, K, p-1$" and insert --$0, 1, \ldots, p-1$--.

In Column 28, Line 52, delete "$g_0, g_1, K, g_{M-1}$" and insert --$g_0, g_1, \ldots g_{M-1}$--.

In Column 28, Line 58, delete "$f_0, f_1, K, f_{M-1}$" and insert --$f_0, f_1, \ldots f_{M-1}$--.

In Column 28, Line 58, delete "$f_0, f_1, K, f_{M-1}$" and insert --$f_0, f_1, \ldots f_{M-1}$--.

In Column 28, Line 59, delete "$x_0, x_1, K, x_{LM-1}$" and insert --$x_0, x_1, \ldots, x_{LM-1}$--.

In Column 28, Line 66, delete "$0, 1, K, L-1$" and insert --$0, 1, \ldots, L-1$--.

In Column 28, Line 67, delete "$0, 1, K, LM-1$" and insert --$0, 1, \ldots, LM-1$--.

In Column 29, Line 6-7, delete "$f_0, f_1, K, f_{M-1}$" and insert --$f_0, f_1, \ldots f_{M-1}$--.

In Column 29, Line 7, delete "$f_0, f_1, K, f_{M-1}$" and insert --$f_0, f_1, \ldots f_{M-1}$--.

In Column 29, Line 8, delete "$x_0, x_1, K, x_{LM-1}$" and insert --$x_0, x_1, \ldots, x_{LM-1}$--.

In Column 29, Line 15, delete "$0, 1, K, L-1$" and insert --$0, 1, \ldots, L-1$--.

In Column 29, Line 16, delete "$0, 1, K, LM-1$" and insert --$0, 1, \ldots, LM-1$--.

In Column 29, Line 22, delete "$g_0, g_1, K, g_{M-1}$" and insert --$g_0, g_1, \ldots g_{M-1}$--.

In Column 29, Line 23, delete "$g_0, g_1, K, g_{M-1}$" and insert --$g_0, g_1, \ldots g_{M-1}$--.

In Column 29, Line 24, delete "$h_0, h_1, K, h_{LM-1}$" and insert --$h_0, h_1, \ldots, h_{LM-1}$--.

In Column 29, Line 30, delete "$0, 1, K, L-1$" and insert --$0, 1, \ldots, L-1$--.

In Column 29, Line 37-38, delete "$g_0, g_1, K, g_{M-1}$" and insert --$g_0, g_1, \ldots g_{M-1}$--.

In Column 29, Line 39, delete "$h_0, h_1, K, h_{LM-1}$" and insert --$h_0, h_1, \ldots, h_{LM-1}$--.

In Column 29, Line 46, delete "$0, 1, K, L-1$" and insert --$0, 1, \ldots, L-1$--.

In Column 31, Line 48, delete "$a_0, a_1, K, a_{M-1}$" and insert --$a_0, a_1, \ldots, a_{M-1}$--.

In Column 31, Line 49, delete "$c_0, c_1, K, c_{K-1}$" and insert --$c_0, c_1, \ldots, c_{K-1}$--.

In Column 31, Line 56, delete "$0, 1, K, p-1$" and insert --$0, 1, \ldots, p-1$--.

In Column 31, Line 56-57, delete "$0,1,K,M-1$" and insert --$0,1,\ldots,M-1$--.

In Column 31, Line 59, delete "$b_0,b_1,K,b_{M-1}$" and insert --$b_0,b_1,\ldots,b_{M-1}$--.

In Column 31, Line 60-61, delete "$d_0,d_1,K,d_{K-1}$" and insert --$d_0,d_1,\ldots,d_{K-1}$--.

In Column 31, Line 67, delete "$0,1,K,p-1$" and insert --$0,1,\ldots,p-1$--.

In Column 32, Line 2, delete "$a_0,a_1,K,a_{M-1}$" and insert --$a_0,a_1,\ldots,a_{M-1}$--.

In Column 32, Line 3, delete "$c_0,c_1,K,c_{K-1}$" and insert --$c_0,c_1,\ldots,c_{K-1}$--.

In Column 32, Line 11, delete "$0,1,K,M-1$" and insert --$0,1,\ldots,M-1$--.

In Column 32, Line 12-13, delete "$b_0,b_1,K,b_{M-1}$" and insert --$b_0,b_1,\ldots,b_{M-1}$--.

In Column 32, Line 14, delete "$d_0,d_1,K,d_{K-1}$" and insert --$d_0,d_1,\ldots,d_{K-1}$--.

In Column 32, Line 21, delete "$0,1,K,p-1$" and insert --$0,1,\ldots,p-1$--.

In the Claims

In Claim 2, Column 34, Line 45, delete "$a_0,a_1,K,a_{M-1}$" and insert --$a_0,a_1,\ldots,a_{M-1}$--.

In Claim 2, Column 34, Line 46-47, delete "$c_0,c_1,K,c_{K-1}$" and insert --$c_0,c_1,\ldots,c_{K-1}$--.

In Claim 2, Column 34, Line 53, delete "$0,1,K,p-1$" and insert --$0,1,\ldots,p-1$--.

In Claim 2, Column 34, Line 53-54, delete "$0,1,K,M-1$" and insert --$0,1,\ldots,M-1$--.

In Claim 3, Column 34, Line 56, delete "$b_0,b_1,K,b_{M-1}$" and insert --$b_0,b_1,\ldots,b_{M-1}$--.

In Claim 3, Column 34, Line 58, delete "$d_0,d_1,K,d_{K-1}$" and insert --$d_0,d_1,\ldots,d_{K-1}$--.

In Claim 3, Column 34, Line 64, delete "$0,1,K,p-1$" and insert --$0,1,\ldots,p-1$--.

In Claim 7, Column 35, Line 48, delete "$a_0,a_1,K,a_{M-1}$" and insert --$a_0,a_1,\ldots,a_{M-1}$--.

In Claim 7, Column 35, Line 49-50, delete "$c_0,c_1,K,c_{K-1}$" and insert --$c_0,c_1,\ldots,c_{K-1}$--.

In Claim 7, Column 35, Line 56, delete "$0,1,K,p-1$" and insert --$0,1,\ldots,p-1$--.

In Claim 7, Column 35, Line 57, delete "$0,1,K,M-1$" and insert --$0,1,\ldots,M-1$--.

In Claim 8, Column 35, Line 59, delete "$b_0,b_1,K,b_{M-1}$" and insert --$b_0,b_1,\ldots,b_{M-1}$--.

CERTIFICATE OF CORRECTION (continued)
U.S. Pat. No. 10,812,305 B2

In Claim 8, Column 35, Line 61, delete "$d_0, d_1, K, d_{K-1}$" and insert --$d_0, d_1, \ldots, d_{K-1}$--.

In Claim 8, Column 35, Line 66, delete "$0, 1, K, p-1$" and insert --$0, 1, \ldots, p-1$--.

In Claim 12, Column 36, Line 46, delete "$a_0, a_1, K, a_{M-1}$" and insert --$a_0, a_1, \ldots, a_{M-1}$--.

In Claim 12, Column 36, Line 48, delete "$c_0, c_1, K, c_{K-1}$" and insert --$c_0, c_1, \ldots, c_{K-1}$--.

In Claim 12, Column 36, Line 54, delete "$0, 1, K, p-1$" and insert --$0, 1, \ldots, p-1$--.

In Claim 12, Column 36, Line 55, delete "$0, 1, K, M-1$" and insert --$0, 1, \ldots, M-1$--.

In Claim 13, Column 36, Line 57, delete "$b_0, b_1, K, b_{M-1}$" and insert --$b_0, b_1, \ldots, b_{M-1}$--.

In Claim 13, Column 36, Line 59, delete "$d_0, d_1, K, d_{K-1}$" and insert --$d_0, d_1, \ldots, d_{K-1}$--.

In Claim 13, Column 36, Line 65, delete "$0, 1, K, p-1$" and insert --$0, 1, \ldots, p-1$--.

In Claim 17, Column 38, Line 2, delete "$a_0, a_1, K, a_{M-1}$" and insert --$a_0, a_1, \ldots, a_{M-1}$--.

In Claim 17, Column 38, Line 3, delete "$c_0, c_1, K, c_{K-1}$" and insert --$c_0, c_1, \ldots, c_{K-1}$--.

In Claim 17, Column 38, Line 10, delete "$0, 1, K, p-1$" and insert --$0, 1, \ldots, p-1$--.

In Claim 17, Column 38, Line 11, delete "$0, 1, K, M-1$" and insert --$0, 1, \ldots, M-1$--.

In Claim 18, Column 38, Line 13, delete "$b_0, b_1, K, b_{M-1}$" and insert --$b_0, b_1, \ldots, b_{M-1}$--.

In Claim 18, Column 38, Line 15, delete "$d_0, d_1, K, d_{K-1}$" and insert --$d_0, d_1, \ldots, d_{K-1}$--.

In Claim 18, Column 38, Line 20, delete "$0, 1, K, p-1$" and insert --$0, 1, \ldots, p-1$--.